United States Patent
Shan et al.

(10) Patent No.: US 12,052,650 B2
(45) Date of Patent: Jul. 30, 2024

(54) METHOD AND APPARATUS FOR INFORMING USER EQUIPMENT OF OPTIMIZATION MODES FOR EARLY DATA TRANSMISSION

(71) Applicant: Huawei Technologies Co., Ltd., Shenzhen (CN)

(72) Inventors: Baokun Shan, Beijing (CN); Odile Rollinger, Cambridge (GB); Yan Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 890 days.

(21) Appl. No.: 16/993,978

(22) Filed: Aug. 14, 2020

(65) Prior Publication Data

US 2020/0374780 A1 Nov. 26, 2020

Related U.S. Application Data

(63) Continuation of application No. PCT/CN2018/076905, filed on Feb. 14, 2018.

(51) Int. Cl.
| | | |
|---|---|---|
| H04W 48/10 | (2009.01) | |
| H04W 28/06 | (2009.01) | |
| H04W 72/044 | (2023.01) | |

(52) U.S. Cl.
CPC ........... *H04W 48/10* (2013.01); *H04W 28/06* (2013.01); *H04W 72/044* (2013.01)

(58) Field of Classification Search
None
See application file for complete search history.

(56) References Cited

U.S. PATENT DOCUMENTS

| | | | | |
|---|---|---|---|---|
| 2019/0350037 A1* | 11/2019 | Lee | ................... | H04W 52/0229 |
| 2020/0037345 A1* | 1/2020 | Ryoo | ..................... | H04W 76/27 |
| 2020/0037368 A1* | 1/2020 | Höglund | ............... | H04W 72/23 |
| 2020/0187245 A1* | 6/2020 | Fujishiro | ........... | H04W 74/0833 |

(Continued)

FOREIGN PATENT DOCUMENTS

| | | |
|---|---|---|
| CN | 101557586 A | 10/2009 |
| CN | 102017435 A | 4/2011 |

(Continued)

OTHER PUBLICATIONS

Qualcomm Inc., "UL early data transmission," Agenda Item 9.14.2, 3GPP TSG-RAN WG2 Meeting #99, Berlin, Germany, Aug. 21-25, 2017, R2-1708239, pp. 1-12 (Year: 2017).*

(Continued)

*Primary Examiner* — Benjamin Lamont
(74) *Attorney, Agent, or Firm* — Leydig, Voit & Mayer, Ltd.

(57) ABSTRACT

Embodiments of this application provide an information processing method and an apparatus. The information processing method includes: determining, by a network device, an early-data-transmission terminal type supported by the network device, wherein the early-data-transmission terminal type comprises at least a terminal device using a user plane (UP) or a control plane (CP) optimization mode in performing early data transmission; and sending, by the network device to the terminal device, information about the early-data-transmission terminal type supported by the network device.

20 Claims, 11 Drawing Sheets

(56) References Cited

U.S. PATENT DOCUMENTS

| | | | | |
|---|---|---|---|---|
| 2020/0236598 A1* | 7/2020 | Kim | ........... | H04W 36/0079 |
| 2020/0374934 A1* | 11/2020 | Koskinen | ........... | H04W 76/27 |
| 2020/0374966 A1* | 11/2020 | Chang | ........... | H04W 76/27 |
| 2022/0256587 A1* | 8/2022 | Fujishiro | ........... | H04W 74/0833 |

FOREIGN PATENT DOCUMENTS

| | | |
|---|---|---|
| CN | 102239736 A | 11/2011 |
| CN | 103596632 A | 2/2014 |
| CN | 104584649 A | 4/2015 |
| CN | 107046728 A | 8/2017 |
| WO | 2016007257 A1 | 1/2016 |

OTHER PUBLICATIONS

"3rd Generation Partnership Project;Technical Specification Group Radio Access Network;Evolved Universal Terrestrial Radio Access (E-UTRA); Radio Resource Control (RRC);Protocol specification(Release 15)," 3GPP TS 36.331 V15.0.1, total 776 pages, 3rd Generation Partnership Project, Vabonne, France (Jan. 2018).

"Data transmission during random access procedure," 3GPP TSG RAN WG1 Meeting #90bis, Prague, Czech Republic, R1-1717229, total 3 pages, 3rd Generation Partnership Project, Vabonne, France (Oct. 9-13, 2017).

"3rd Generation Partnership Project;Technical Specification Group Radio Access Network;Evolved Universal Terrestrial Radio Access (E-UTRA);Medium Access Control (MAC) protocol specification(Release 15)," 3GPP TS 36.321 V15.0.0, total 109 pages, 3rd Generation Partnership Project, Vabonne, France (Dec. 2017).

"LS on agreements on early data transmission during random access procedure for NB-IoT and BL/CE UEs in Rel-15," 3GPP TSG RAN WG1 Meeting 90bis, Prague, Czech Republic, R1-1719103, total 1 page, 3rd Generation Partnership Project, Vabonne, France (Oct. 9-13, 2017).

LG Electronics Inc, "Early data transmission for User plane CIoT optimisation", 3GPP TSG-RAN WG2 Meeting #99-Bis, R2-1711158, Prague, Czech Republic, total 3 pages, 3rd Generation Partnership Project (Oct. 9-13, 2017).

LG Electronics Inc., "Early data transmission for Control plane CIoT optimisation", 3GPP TSG-RAN WG2 Meeting #99-Bis, R2-1711159, Prague, Czech Republic, total 3 pages, 3rd Generation Partnership Project (Oct. 9-13, 2017).

Huawei et al., "Remaining issues for EDT in the CP solution for eMTC and Nb-Iot", 3GPP TSG-RAN WG2 Meeting #101, R2-1802215, Athens, Greece, total 7 pages, 3rd Generation Partnership Project (Feb. 26-Mar. 2, 2018).

* cited by examiner

METHOD AND APPARATUS FOR INFORMING USER EQUIPMENT OF OPTIMIZATION MODES FOR EARLY DATA TRANSMISSION

CROSS-REFERENCE TO RELATED APPLICATIONS

This application is a continuation of International Application No. PCT/CN2018/076905, filed on Feb. 14, 2018, which is hereby incorporated by reference in its entirety.

TECHNICAL FIELD

Embodiments of this application relate to the communications field, and in particular, to an information processing method and an apparatus.

BACKGROUND

A 5th generation (5G) mobile communications system emerges to cope with future explosive growth of mobile data traffic, massive device connections, and continuous emergence of various new services and application scenarios. As a part of 5G, the internet of things has a rapidly increasing market demand. A forecast shows that a quantity of connections to the 5G internet of things will reach 18 billion by the year 2022.

Currently, a solution for a feature of the internet of things includes, for example, a narrowband internet of things (NB-IoT) network and a machine type communication (MTC) network. A feature of a narrowband technology is used to carry an internet of things service. The NB-IoT network uses a new air interface technology independent of a cellular network, and a terminal has lower costs and supports a lower rate and lower mobility. The MTC network has some features of the cellular network, but costs and complexity of a terminal in the MTC network are slightly higher than those of the terminal in the NB-IoT network, but the terminal in the MTC network can support a higher rate and better mobility.

Currently, both the NB-IoT network and the MTC network have been put into commercial use in a live network. However, there is a new application scenario needing to be supported by a technical solution such as a wake-up signal feature that reduces power consumption consumed when a terminal listens to paging. Currently, a new information processing method is urgently needed to meet a requirement of the new application scenario in the NB-IoT network and/or the MTC network.

SUMMARY

Embodiments of this application provide an information processing method and an apparatus, to communicate configuration information of a wake-up signal, so that a terminal device (i.e. a terminal) reduces paging power consumption of the terminal device through listening to the wake-up signal, and network resource utilization is improved.

According to a first aspect, an embodiment of this application provides an information processing method, including: determining, by a network device (e.g. a base station), configuration information of a wake-up signal, where the wake-up signal is used to indicate whether to page a terminal device within a time period, and the configuration information of the wake-up signal is used to indicate a time interval between two adjacent wake-up signals (including a time interval between possible locations of the two wake-up signals); and sending, by the network device, the configuration information of the wake-up signal to a core network device.

In this embodiment of this application, the wake-up signal is used to indicate whether to page the terminal device within the time period, and a value of the time period may be determined by the network device. The wake-up signal is mainly used for a terminal device with a short paging cycle but a very low probability of being paged. The terminal device wakes up to receive a paging message only when detecting the wake-up signal through listening. If the terminal device does not receive the wake-up signal, the terminal device does not listen to the paging message from the network device until detecting, through listening, the wake-up signal indicating that the terminal is to be paged. The configuration information of the wake-up signal is used to indicate the time interval between the two adjacent wake-up signals. An implementation of the configuration information is not limited.

It should be noted that in this application, the configuration information of the wake-up signal is used to indicate the time interval between the two adjacent wake-up signals, or the configuration information of the wake-up signal is used to indicate a time interval between two consecutive times of detecting the wake-up signal by the terminal device. For example, the wake-up signal may have two cases. In a case 1, if the network device sends the wake-up signal, it indicates that the terminal device needs to be woken up; if the network device does not send the wake-up signal, it indicates that the terminal device is not to be woken up. In a case 2, the wake-up signal has at least two states. A state 1 (for example, 01) indicates waking up the terminal device, and a state 2 (for example, 10) indicates not waking up the terminal device.

For example, a function of the wake-up signal is to indicate whether there is paging to the terminal device in a future time period. A signal having a wake-up function may be the wake-up signal. For example, whether the signal exists may be used to indicate whether there is paging in the future time period. If the terminal device detects the wake-up signal at a corresponding location, it means that the network device is to send the paging message. If the terminal device does not detect the wake-up signal, it means that there is no paging message subsequently, and the terminal device attempts to detect the wake-up signal at a next signal location. For another example, different states of the wake-up signal may be used to indicate whether there is a paging message in the future time period. If the terminal device detects a specific signal state, for example, 01, at a corresponding location, it indicates that the paging message is to be received. If the terminal device detects another state, for example, 10, it means that there is no paging message subsequently. In this embodiment of this application, listening overheads caused when the terminal device listens to conventional paging can be reduced by using the wake-up signal. Because the wake-up signal is relatively simple, compared with listening to a PDCCH in the conventional paging, listening to the wake-up signal saves resources. If the terminal device is not paged, the terminal device listens to only the wake-up signal. This saves network resources.

It can be learned from the foregoing example descriptions in this embodiment that, in this embodiment of this application, the network device may determine the configuration information of the wake-up signal, the wake-up signal is used to indicate whether to page the terminal device within the time period, the configuration information is used to indicate the time interval between the two adjacent wake-up signals, and the network device sends the configuration information of the wake-up signal to the core network device. The core network device may receive the configuration information of the wake-up signal from the network device. Therefore, in this embodiment of this application, the configuration information of the wake-up signal can be communicated. After receiving the configuration information of the wake-up signal, the core network device may complete paging configuration of the core network device for the terminal device based on the configuration information, so that the terminal device reduces paging power consumption of the terminal device through listening to the wake-up signal, and network resource utilization is improved.

In a possible design of the first aspect, the configuration information of the wake-up signal includes at least one of the following information: information indicating a periodicity of the wake-up signal, information indicating a correspondence between the wake-up signal and a discontinuous reception DRX cycle, or information indicating the time period. The information indicating the periodicity of the wake-up signal may be specifically periodicity information of the wake-up signal, or other information that can be used to determine a value of the periodicity of the wake-up signal. The information indicating the correspondence between the wake-up signal and the DRX cycle may be specifically information about the correspondence between the wake-up signal and the DRX cycle. For example, the correspondence between the wake-up signal and the DRX cycle may be that one wake-up signal corresponds to a value of a quantity of DRX cycles. For example, a letter x is used to represent the quantity of DRX cycles corresponding to one wake-up signal, and a value of x may be a positive integer such as 1 or 2. The information indicating the time period is a value, of the time period, that indicates that the wake-up signal is used to page the terminal device within the time period. For example, if the time period represents three subframes, the wake-up signal needs to be used to page the terminal device within three subframes. In this embodiment of this application, a usage threshold of the wake-up signal is an eDRX cycle threshold for using the wake-up signal. A value unit of the usage threshold may be a time unit such as second or millisecond, or may be a slot, a subframe, a system frame, a super frame, or the like that can reflect time. In this application, the slot, the subframe, the system frame, or the super frame of time is an example of one or more time units. It may be understood that, unless otherwise stated, the example of the time unit provided in this application may be replaced with another time unit. For example, the subframe may be replaced with the slot.

In a possible design of the first aspect, the configuration information of the wake-up signal further includes information indicating a start location and duration of the wake-up signal in one periodicity. The start location and the duration of the wake-up signal in one periodicity may be used as the configuration information of the wake-up signal. The start location represents a location at which the wake-up signal starts to be sent in one periodicity. The duration represents a quantity of unit times (which may also be referred to as time units, such as symbols, slots, or subframes) occupied by the wake-up signal in one periodicity. A signal configuration parameter of the wake-up signal may be more accurately described by using the information indicating the start location and the duration of the wake-up signal in one periodicity.

In a possible design of the first aspect, the method further includes: sending, by the network device to the core network device, information indicating the DRX cycle. The DRX cycle may be configured by the base station, and each terminal device has one paging occasion within one DRX cycle. The information indicating the DRX cycle may be specifically configuration information of the DRX cycle or other information that can be used to determine a value of the DRX cycle. The network device sends, to the core network device, the information indicating the DRX cycle, so that the core network device can obtain the information indicating the DRX cycle, and the core network device can obtain a value parameter of the DRX cycle based on the information indicating the DRX cycle.

In a possible design of the first aspect, the sending, by the network device, the configuration information of the wake-up signal to a core network device includes: sending, by the network device, an interface setup request message to the core network device, where the interface setup request message carries the configuration information of the wake-up signal; or sending, by the network device, a configuration update message of the network device to the core network device, where the configuration update message carries the configuration information of the wake-up signal. The interface setup request message is a request message sent by the network device when an interface is set up between the network device and the core network device. The interface setup request message is used to carry the configuration information of the wake-up signal. For example, a field may be added to the interface setup request message to carry the configuration information of the wake-up signal, or an extensible field in the interface setup request message is used to carry the configuration information of the wake-up signal. The configuration update message of the network device indicates a notification message sent by the network device to the core network device when the network device has a configuration update.

According to a second aspect, an embodiment of this application provides an information processing method, including: receiving, by a core network device, configuration information of a wake-up signal from a network device, where the wake-up signal is used by the network device to indicate whether to page a terminal device within a time period, and the configuration information is used to indicate a time interval between two adjacent wake-up signals (including a time interval between possible locations of the two wake-up signals).

It can be learned from the foregoing example descriptions in this embodiment that, in this embodiment of this application, the core network device may receive the configuration information of the wake-up signal from the network device, the wake-up signal is used to indicate whether to page the terminal device within the time period, the configuration information is used to indicate the time interval between the two adjacent wake-up signals (including the time interval between the possible locations of the two wake-up signals). Therefore, in this embodiment of this application, the configuration information of the wake-up signal can be communicated. After receiving the configuration information of the wake-up signal, the core network device may complete paging configuration of the core network device for the terminal device based on the configuration information, so that the terminal device reduces paging power consumption of the terminal device through listening to the wake-up signal, and network resource utilization is improved.

In a possible design of the second aspect, the method further includes: determining, by the core network device, a paging time window PTW length of the terminal device based on the configuration information of the wake-up signal, where the PTW length is greater than the time interval between the two adjacent wake-up signals. The core network device may determine the PTW length of the terminal device based on the configuration information of the wake-up signal. The PTW length determined by the core network device is greater than the time interval between the two adjacent wake-up signals, and the wake-up signal is sent periodically. Therefore, there is more than one wake-up signal in one PTW. In this way, a paging delay caused by missing a wake-up opportunity and waiting for a next eDRX cycle is avoided, and network resource utilization is improved.

In a possible design of the second aspect, the receiving, by a core network device, configuration information, of a wake-up signal from a network device includes: receiving, by the core network device, an interface setup request message from the network device, where the interface setup request message carries the configuration information of the wake-up signal; or receiving, by the core network device, a configuration update message of the network device from the network device, where the configuration update message carries the configuration information of the wake-up signal. The core network device may receive the interface setup request message from the network device, and the interface setup request message is a request message sent by the network device when an interface is set up between the network device and the core network device. The interface setup request message is used to carry the configuration information of the wake-up signal. For example, a field may be added to the interface setup request message to carry the configuration information of the wake-up signal, or an extensible field in the interface setup request message is used to carry the configuration information of the wake-up signal. The core network device may alternatively receive the configuration update message of the network device from the network device. The configuration update message of the network device indicates a notification message sent by the network device to the core network device when the network device has a configuration update. For example, a field may be added to the configuration update message to carry the configuration information of the wake-up signal, or an extensible field in the configuration update message is used to carry the configuration information of the wake-up signal.

In a possible design of the second aspect, the configuration information of the wake-up signal includes information indicating a periodicity of the wake-up signal, and the determining, by the core network device, a paging time window PTW length of the terminal device based on the configuration information of the wake-up signal includes: determining, by the core network device, the PTW length based on the periodicity of the wake-up signal, where the PTW length is greater than a value of the periodicity of the wake-up signal. The core network device determines the PTW length based on the value of the periodicity of the wake-up signal, and the PTW length determined by the core network device is greater than the value of the periodicity of the wake-up signal. For example, the PTW length may be greater than or equal to a result obtained by multiplying a by the value of the periodicity of the wake-up signal. In this way, there may be at least a wake-up signals in one PTW length. A value of a may be a positive integer. For example, when the value of a is 2, there are two wake-up signals within the PTW length calculated by the core network device. For another example, when the value of a is 3, there are three wake-up signals within the PTW length calculated by the core network device.

In a possible design of the second aspect, the configuration information of the wake-up signal includes information indicating a correspondence between the wake-up signal and a discontinuous reception DRX cycle, and the determining, by the core network device, a paging time window PTW length of the terminal device based on the configuration information of the wake-up signal includes: determining, by the core network device, that the correspondence between the wake-up signal and the discontinuous reception DRX cycle is that one wake-up signal corresponds to x DRX cycles, where x is a positive integer; and determining, by the core network device, the PTW length based on the correspondence between the wake-up signal and the discontinuous reception DRX cycle, where the PTW length is greater than a result obtained by multiplying x by a value of the DRX cycle. The core network device determines the PTW length based on the correspondence between the wake-up signal and the discontinuous reception DRX cycle, one wake-up signal corresponds to x DRX cycles, and x is a positive integer. For example, a value of x is 2. The PTW length determined by the core network device is greater than the result obtained by multiplying x by the value of the DRX cycle. For example, the PTW length may be greater than or equal to a result obtained by multiplying the value of the DRX cycle by a result obtained by multiplying a by x. The result obtained by multiplying x by the value of the DRX cycle corresponds to one wake-up signal. In this way, there may be at least a wake-up signals in one PTW length. A value of a may be a positive integer. For example, when the value of a is 2, there are two wake-up signals within the PTW length calculated by the core network device. For another example, when the value of a is 3, there are three wake-up signals within the PTW length calculated by the core network device.

In a possible design of the second aspect, the configuration information of the wake-up signal includes information indicating the time period, and the determining, by the core network device, a paging time window PTW length of the terminal device based on the configuration information of the wake-up signal includes: determining, by the core network device, the PTW length based on information about the time period, where the PTW length is greater than a value of the time period. The core network device determines the PTW length based on the value of the time period of the wake-up signal, and the PTW length determined by the core network device is greater than the value of the time period of the wake-up signal. For example, the PTW length may be greater than or equal to a result obtained by multiplying a by the value of the time period of the wake-up signal. In this way, there may be at least a wake-up signals in one PTW length. A value of a may be a positive integer. For example, when the value of a is 2, there are two wake-up signals within the PTW length calculated by the core network device. For another example, when the value of a is 3, there are three wake-up signals within the PTW length calculated by the core network device.

In a possible design of the second aspect, the method further includes: sending, by the core network device, a paging message to the network device, where the paging message includes an extended discontinuous reception eDRX cycle. The core network device may send the determined eDRX cycle of the terminal device to the network device, so that the network device can receive the eDRX cycle. In this way, the network device may compare the eDRX cycle with a usage threshold of the wake-up signal, to determine a value relationship between the eDRX cycle and the usage threshold of the wake-up signal, and then determine whether to use the wake-up signal.

In a possible design of the second aspect, the method further includes: sending, by the core network device to the terminal device, information indicating the PTW length; and/or sending, by the core network device to the network device, the paging message for the terminal device, where the paging message includes the information indicating the PTW length. The core network device may configure the determined PTW length of the terminal device for the terminal device. For example, the core network device sends the PTW length of the terminal device to the terminal device in a transparent transmission manner, so that the terminal device can determine whether need to listen to the wake-up signal within the PTW length, or determine whether need to listen to a paging signal within the PTW length. The core network device may alternatively send, to the network device, the paging message for the terminal device, where the paging message includes the information indicating the PTW length. In this way, the network device can determine whether need to send the wake-up signal within the PTW length, or determine whether need to send the paging signal within the PTW length.

According to a third aspect, an embodiment of this application provides an information processing method, including: determining, by a network device, a usage threshold of a wake-up signal; and sending, by the network device, the usage threshold of the wake-up signal to a terminal device.

The usage threshold of the wake-up signal is a threshold for determining whether the wake-up signal is valid. The usage threshold may depend on a network resource status of the network device. If there are many network resources, the usage threshold may be set to a large value. If there are a few network resources, the usage threshold may be set to a small value. For another example, the usage threshold may alternatively depend on distribution of eDRX cycles of terminal devices in a network. When eDRX cycles of b % of the terminals each are less than c, the usage threshold may be set to c. Values of b and c may be determined based on a scenario. The network device and the terminal device may determine, based on the usage threshold of the wake-up signal, whether to use the wake-up signal. If the network device determines to use the wake-up signal, the network device sends the wake-up signal to the terminal device. If the terminal device determines to use the wake-up signal, the terminal device listens to the wake-up signal.

It can be learned from the foregoing example descriptions in this embodiment that, in this embodiment of this application, the network device sends the usage threshold of the wake-up signal to the terminal device. Therefore, in this embodiment of this application, the usage threshold of the wake-up signal can be communicated. After receiving the usage threshold of the wake-up signal, the terminal device may determine, based on the usage threshold and the eDRX cycle, whether to listen to the wake-up signal. When the eDRX cycle of the terminal device is less than or equal to the usage threshold of the wake-up signal, the terminal device listens to the wake-up signal, so that the terminal device reduces paging power consumption of the terminal device through listening to the wake-up signal, and network resource utilization is improved.

In a possible design of the third aspect, the method further includes: receiving, by the network device, a paging message from the core network device, where the paging message includes an extended discontinuous reception eDRX cycle; and sending, by the network device, the wake-up signal to the terminal device when the network device determines that the eDRX cycle is less than or equal to the usage threshold of the wake-up signal. The core network device may send the determined eDRX cycle of the terminal device to the network device, and the network device may receive the eDRX cycle. In this way, the network device may compare the eDRX cycle with the usage threshold of the wake-up signal, to determine a value relationship between the eDRX cycle and the usage threshold of the wake-up signal, and then determine whether to use the wake-up signal. When determining that the eDRX cycle is less than or equal to the usage threshold of the wake-up signal, the network device sends the wake-up signal to the terminal device, and the network device can wake up the terminal device by using the wake-up signal. Then, the network device may page the terminal device. In this way, when the terminal device does not detect the wake-up signal through listening, the terminal device does not listen to the paging message from the network device until detecting the wake-up signal through listening. In this way, network resources can be saved.

In a possible design of the third aspect, the sending, by the network device, the usage threshold of the wake-up signal to the terminal device includes: broadcasting, by the network device, the usage threshold of the wake-up signal. The network device may send a broadcast message to the terminal device, and the broadcast message carries the usage threshold of the wake-up signal. After receiving the broadcast message, all terminal devices in a cell served by the network device may determine the usage threshold of the wake-up signal by using the broadcast message. The network device broadcasts the usage threshold of the wake-up signal, thereby effectively improving information sending efficiency.

In a possible design of the third aspect, the method further includes: receiving, by the network device from the core network device, the paging message for the terminal device, where the paging message includes information indicating a paging time window PTW length of the terminal device, and the PTW length is greater than a time interval between two adjacent wake-up signals. The core network device may configure the determined PTW length of the terminal device for the terminal device. For example, the core network device sends the PTW length of the terminal device to the terminal device in a transparent transmission manner, so that the terminal device can determine whether need to listen to the wake-up signal within the PTW length, or determine whether need to listen to a paging signal within the PTW length.

According to a fourth aspect, an embodiment of this application provides an information processing method, including: receiving, by a terminal device, a usage threshold of a wake-up signal from a network device; and listening to, by the terminal device, the wake-up signal when an extended discontinuous reception eDRX cycle of the terminal device is less than or equal to the usage threshold of the wake-up signal.

It can be learned from the foregoing example descriptions in this embodiment that, in this embodiment of this application, the terminal device receives the usage threshold of the wake-up signal from the network device. When the eDRX cycle of the terminal device is less than or equal to the usage threshold of the wake-up signal, the terminal device listens to the wake-up signal. Therefore, in this embodiment of this application, the usage threshold of the wake-up signal can be communicated. After receiving the usage threshold of the wake-up signal, the terminal device may determine, based on the usage threshold and the eDRX cycle, whether to listen to a paging message. When the eDRX cycle of the terminal device is less than or equal to the usage threshold of the wake-up signal, the terminal device listens to the wake-up signal, so that the terminal device reduces paging power consumption of the terminal device through listening to the wake-up signal, and network resource utilization is improved.

In a possible design of the fourth aspect, the method further includes: listening to, by the terminal device, a paging message from the network device when the eDRX cycle of the terminal device is greater than or equal to the usage threshold of the wake-up signal. If the eDRX cycle of the terminal device is greater than the threshold, the terminal device directly listens to the paging message. Directly listening to the paging message means that the terminal device no longer listens to the wake-up signal, but listens to the paging message based on a PTW length and the eDRX cycle.

In a possible design of the fourth aspect, the method further includes: when detecting the wake-up signal through listening, listening to, by the terminal device, the paging message from the network device within a time period indicated by the wake-up signal. When determining that the eDRX cycle is less than or equal to the usage threshold of the wake-up signal, the network device sends the wake-up signal to the terminal device, and the network device can wake up the terminal device by using the wake-up signal. Then, the network device may page the terminal device. In this way, when the terminal device does not detect the wake-up signal through listening, the terminal device does not listen to the paging message from the network device until detecting the wake-up signal through listening. In this way, network resources can be saved.

In a possible design of the fourth aspect, the method further includes: receiving, by the terminal device from a core network device, information indicating a paging time window PTW length, where the paging time window PTW length is greater than a time interval between two adjacent wake-up signals. The core network device may configure the determined PTW length of the terminal device for the terminal device. For example, the core network device sends the PTW length of the terminal device to the terminal device in a transparent transmission manner, so that the terminal device can determine whether need to listen to the wake-up signal within the PTW length, or determine whether need to listen to a paging signal within the PTW length.

According to a fifth aspect, an embodiment of this application further provides a network device, including: a processing module, configured to determine configuration information of a wake-up signal, where the wake-up signal is used to indicate whether to page a terminal device within a time period, and the configuration information of the wake-up signal is used to indicate a time interval between two adjacent wake-up signals (including a time interval between possible locations of the two wake-up signals); and a transmit module, configured to send the configuration information of the wake-up signal to a core network device.

In the fifth aspect of this application, the composition modules of the network device may further perform the steps described in the first aspect and the possible implementations. For details, refer to the descriptions in the first aspect and the possible implementations.

According to a sixth aspect, an embodiment of this application further provides a core network device, including: a receiving module, configured to receive configuration information of a wake-up signal from a network device, where the wake-up signal is used by the network device to indicate whether to page a terminal device within a time period, and the configuration information is used to indicate a time interval between two adjacent wake-up signals (including a time interval between possible locations of the two wake-up signals).

In the sixth aspect of this application, the composition modules of the core network device may further perform the steps described in the second aspect and the possible implementations. For details, refer to the descriptions in the second aspect and the possible implementations.

According to a seventh aspect, an embodiment of this application further provides a core network device, including: a processing module, configured to determine a usage threshold of the wake-up signal; and a transmit module, configured to send the usage threshold of the wake-up signal to the terminal device.

In the seventh aspect of this application, the composition modules of the core network device may further perform the steps described in the third aspect and the possible implementations. For details, refer to the descriptions in the third aspect and the possible implementations.

According to an eighth aspect, an embodiment of this application provides a terminal device, including: a receiving module, configured to receive a usage threshold of a wake-up signal from a network device; and a processing module, configured to listen to the wake-up signal when an extended discontinuous reception eDRX cycle of the terminal device is less than or equal to the usage threshold of the wake-up signal.

In the eighth aspect of this application, the composition modules of the terminal device may further perform the steps described in the fourth aspect and the possible implementations. For details, refer to the descriptions in the fourth aspect and the possible implementations.

According to a ninth aspect, an embodiment of this application provides an information processing method, including: determining, by a network device, an early-data-transmission terminal type supported by the network device, where the early-data-transmission terminal type includes at least one of: a terminal device that uses a user plane UP optimization mode performs early data transmission, or a terminal device that uses a control plane CP optimization mode performs early data transmission; and sending, by the network device to a terminal device, information about the early-data-transmission terminal type supported by the network device.

Compared with conventional transmission after connection setup, in early data transmission, data can be transmitted before connection setup. Therefore, early data transmission is a solution of earlier transmission. Early data transmission may also be data transmission in a random access process. In the conventional data transmission, a terminal device first enters a connected mode through random access, then transmits data in the connected mode, and finally releases connection. However, in this embodiment of this application, an early data transmission procedure allows a terminal to transmit uplink data in the random access process. If the data is relatively small, the terminal may not enter the connected mode, and the data transmission process and the random access process end together.

In this embodiment of this application, the network device sends, to the terminal device, the information about the early-data-transmission terminal type supported by the network device, so that the terminal device can determine, based on the information sent by the network device, the early-data-transmission terminal type supported by the network device. In this embodiment of this application, whether the early data transmission procedure is supported may be separately indicated to different types of terminal devices. In this embodiment of this application, the network device can support at least one early-data-transmission terminal type in performing early data transmission.

In a possible design of the ninth aspect, the determining, by a network device, an early-data-transmission terminal type supported by the network device includes: determining, by the network device, that the network device supports a terminal device that uses the UP optimization mode in performing early data transmission. The network device may support the terminal device that uses the UP optimization mode in performing early data transmission. The early-data-transmission terminal type supported by the network device may be determined by using a configuration parameter of the network device.

In a possible design of the ninth aspect, the sending, by the network device to a terminal device, information about the early-data-transmission terminal type supported by the network device includes: sending, by the network device to the terminal device, information indicating a random access resource used for early data transmission, where the information indicating the random access resource used for early data transmission is used to indicate that the network device supports a terminal device that uses the UP optimization mode in performing early data transmission; or sending, by the network device to the terminal device, information indicating a random access resource used for early data transmission and information indicating that the network device supports a terminal device that uses the UP optimization mode in performing early data transmission.

The information indicating the random access resource used for early data transmission is resource configuration information that is of the random access resource specifically used for early data transmission and that is broadcast by the network device. The information indicating the random access resource used for early data transmission may be used to indicate that the network device supports a terminal device that uses the UP optimization mode in performing early data transmission, so that the terminal device can determine, by parsing the information indicating the random access resource used for early data transmission, that the network device supports a terminal device that uses the UP optimization mode in performing early data transmission.

For another example, the information indicating that the network device supports a terminal device that uses the UP optimization mode in performing early data transmission may be specifically one piece of indication information, and the piece of indication information may be independent of the information indicating the random access resource used for early data transmission. The network device sends, to the terminal device, the information indicating that the network device supports a terminal device that uses the UP optimization mode in performing early data transmission, so that the terminal device can determine, by parsing the information indicating that the network device supports a terminal device that uses the UP optimization mode in performing early data transmission, that the network device supports a terminal device that uses the UP optimization mode in performing early data transmission.

In a possible design of the ninth aspect, the sending, by the network device to a terminal device, information about the early-data-transmission terminal type supported by the network device includes: sending, by the network device to the terminal device, information indicating that the network device supports a terminal device that uses the UP optimization mode; and sending, by the network device to the terminal device, information indicating a random access resource used for early data transmission, where the information indicating that the network device supports a terminal device that uses the UP optimization mode and the information indicating the random access resource used for early data transmission are used to indicate that the network device supports a terminal device that uses the UP optimization mode in performing early data transmission. In this embodiment of this application, that the network device supports a terminal device that uses the UP optimization mode refers to support of the network device for the terminal device that uses the UP optimization mode. To be specific, the information that is sent by the network device and that indicates that the network device supports a terminal device that uses the UP optimization mode only indicates the support of the network device for the terminal device that uses the UP optimization mode. If the network device further sends the information indicating the random access resource used for early data transmission, it indicates that the network device supports a terminal device that uses the CP optimization mode in performing early data transmission. If the terminal device receives the information indicating that the network device supports a terminal device that uses the UP optimization mode, and also receives the information indicating the random access resource used for early data transmission, the terminal device may determine, based on the two pieces of received information, that the network device supports a terminal device that uses the UP optimization mode in performing early data transmission.

In a possible design of the ninth aspect, the determining, by a network device, an early-data-transmission terminal type supported by the network device includes: determining, by the network device, that the network device supports a terminal device that uses the CP optimization mode in performing early data transmission. The network device may support the terminal device that uses the CP optimization mode in performing early data transmission. The early-data-transmission terminal type supported by the network device may be determined by using a configuration parameter of the network device.

In a possible design of the ninth aspect, the sending, by the network device to a terminal device, information about the early-data-transmission terminal type supported by the network device includes: sending, by the network device to the terminal device, information indicating a random access resource used for early data transmission, where the information indicating the random access resource used for early data transmission is used to indicate that the network device supports a terminal device that uses the CP optimization mode in performing early data transmission; or sending, by the network device to the terminal device, information indicating a random access resource used for early data transmission and information indicating that the network device supports a terminal device that uses the CP optimization mode in performing early data transmission.

The information indicating the random access resource used for early data transmission is resource configuration information that is of the random access resource specifically used for early data transmission and that is broadcast by the network device. The information indicating the random access resource used for early data transmission may be used to indicate that the network device supports a terminal device that uses the CP optimization mode in performing early data transmission, so that the terminal device can determine, by parsing the information indicating the random access resource used for early data transmission, that the network device supports a terminal device that uses the CP optimization mode in performing early data transmission. For another example, the information indicating that the network device supports a terminal device that uses the CP optimization mode in performing early data transmission may be specifically one piece of indication information, and the piece of indication information may be independent of the information indicating the random access resource used for early data transmission. The network device sends, to the terminal device, the information indicating that the network device supports a terminal device that uses the CP optimization mode in performing early data transmission, so that the terminal device can determine, by parsing the information indicating that the network device supports a terminal device that uses the CP optimization mode in performing early data transmission, that the network device supports a terminal device that uses the CP optimization mode in performing early data transmission.

In a possible design of the ninth aspect, the sending, by the network device to a terminal device, information about the early-data-transmission terminal type supported by the network device includes: sending, by the network device to the terminal device, information indicating that the network device supports a terminal device that uses the CP optimization mode; and sending, by the network device to the terminal device, information indicating a random access resource used for early data transmission, where the information indicating that the network device supports a terminal device that uses the CP optimization mode and the information indicating the random access resource used for early data transmission are used to indicate that the network device supports a terminal device that uses the CP optimization mode in performing early data transmission. In the foregoing embodiment of this application, that the network device supports a terminal device that uses the CP optimization mode refers to support of the network device for the terminal device that uses the CP optimization mode. To be specific, the information that is sent by the network device and that indicates that the network device supports a terminal device that uses the CP optimization mode only indicates the support of the network device for the terminal device that uses the CP optimization mode. If the network device further sends the information indicating the random access resource used for early data transmission, it indicates that the network device supports a terminal device that uses the CP optimization mode in performing early data transmission. If the terminal device receives the information indicating that the network device supports a terminal device that uses the CP optimization mode, and also receives the information indicating the random access resource used for early data transmission, the terminal device may determine, based on the two pieces of received information, that the network device supports a terminal device that uses the CP optimization mode in performing early data transmission.

In a possible design of the ninth aspect, the determining, by a network device, an early-data-transmission terminal type supported by the network device includes: determining, by the network device, that the network device supports both a terminal device that uses the UP optimization mode and a terminal device that uses the CP optimization mode in performing early data transmission. The network device may support both the terminal device that uses the UP optimization mode and the terminal device that uses the CP optimization mode in performing early data transmission. The early-data-transmission terminal type supported by the network device may be determined by using a configuration parameter of the network device.

In a possible design of the ninth aspect, the sending, by the network device to a terminal device, information about the early-data-transmission terminal type supported by the network device includes: sending, by the network device to the terminal device, information indicating a random access resource used for early data transmission, where the information indicating the random access resource used for early data transmission is used to indicate that the network device supports both a terminal device that uses the UP optimization mode and a terminal device that uses the CP optimization mode in performing early data transmission; or sending, by the network device to the terminal device, information indicating a random access resource used for early data transmission and information indicating that the network device supports both a terminal device that uses the UP optimization mode and a terminal device that uses the CP optimization mode in performing early data transmission.

The information indicating the random access resource used for early data transmission is resource configuration information that is of the random access resource specifically used for early data transmission and that is broadcast by the network device. The information indicating the random access resource used for early data transmission may be used to indicate that the network device supports both a terminal device that uses the UP optimization mode and a terminal device that uses the CP optimization mode in performing early data transmission, so that the terminal device can determine, by parsing the information indicating the random access resource used for early data transmission, that the network device supports both a terminal device that uses the UP optimization mode and a terminal device that uses the CP optimization mode in performing early data transmission. For another example, the information indicating that the network device supports both a terminal device that uses the UP optimization mode and a terminal device that uses the CP optimization mode in performing early data transmission may be specifically one piece of indication information, and the piece of indication information may be independent of the information indicating the random access resource used for early data transmission. The network device sends, to the terminal device, the information indicating that the network device supports both a terminal device that uses the UP optimization mode and a terminal device that uses the CP optimization mode in performing early data transmission, so that the terminal device can determine, by parsing the information indicating that the network device supports both a terminal device that uses the UP optimization mode and a terminal device that uses the CP optimization mode in performing early data transmission, that the network device supports both a terminal device that uses the UP optimization mode and a terminal device that uses the CP optimization mode in performing early data transmission.

In a possible design of the ninth aspect, the sending, by the network device to a terminal device, information about the early-data-transmission terminal type supported by the network device includes: sending, by the network device to the terminal device, information indicating that the network device supports a terminal device that uses the CP optimization mode in performing early data transmission, and information indicating that the network device supports a terminal device that uses the UP optimization mode in performing early data transmission. The network device may send two pieces of indication information. One piece of indication information is used to indicate that the network device supports a terminal device that uses the CP optimization mode in performing early data transmission, and the other piece of indication information is used to indicate that the network device supports a terminal device that uses the UP optimization mode in performing early data transmission.

In a possible design of the ninth aspect, the sending, by the network device to a terminal device, information about the early-data-transmission terminal type supported by the network device includes: sending, by the network device to the terminal device, information indicating a random access resource used for early data transmission, and information indicating that the network device supports a terminal device that uses the UP optimization mode in performing early data transmission, where the information indicating the random access resource used for early data transmission is used to indicate that the network device supports a terminal device that uses the CP optimization mode in performing early data transmission; or sending, by the network device to the terminal device, information indicating a random access resource used for early data transmission, and information indicating that the network device supports a terminal device that uses the CP optimization mode in performing early data transmission, where the information indicating the random access resource used for early data transmission is used to indicate that the network device supports a terminal device that uses the UP optimization mode in performing early data transmission.

In a possible design of the ninth aspect, the sending, by the network device to a terminal device, information about the early-data-transmission terminal type supported by the network device includes: sending, by the network device to the terminal device, information about an early-data-transmission terminal type supported by the network device in a specific range, where the specific range includes at least one of a cell, a carrier, or a coverage level of the network device. The specific range may be predefined in a protocol, or may be indicated by the network device to the terminal device. Details are not described herein. If the network device determines the early-data-transmission terminal type supported in the specific range, when the terminal device determines the early-data-transmission terminal type supported by the network device, the terminal device also needs to first determine whether a requirement on the specific range is met. For example, the terminal device determines a carrier used to initiate early data transmission, where the carrier is randomly selected from available carriers broadcast by the base station or is selected based on an ID of the terminal device. For example, an ID of the used carrier is the terminal ID mod a quantity of carriers that can be used for early data transmission, where mod represents modulo. If the base station indicates that base station supports a type of the terminal in performing early data transmission on the carrier, the early data transmission procedure is to be used. For another example, the terminal determines a coverage level for initiating early data transmission. The terminal determines the coverage level based on link quality measured by the terminal and a correspondence that is broadcast by the base station and that is between link quality and a coverage level. The correspondence is, for example, several thresholds. If the base station indicates that the base station supports a type of the terminal in performing early data transmission at the coverage level, the early data transmission procedure is to be used.

According to a tenth aspect, an embodiment of this application further provides an information processing method, including: determining, by a terminal device, an early-data-transmission terminal type supported by a network device, where the early-data-transmission terminal type includes at least one of: a terminal device that uses a user plane UP optimization mode performs early data transmission, or a terminal device that uses a control plane CP optimization mode performs early data transmission; and determining, by the terminal device, whether to use an early data transmission mode, based on the early-data-transmission terminal type supported by the network device and a transmission type of the terminal device. The transmission type of the terminal device includes: the terminal device uses the UP optimization mode, the terminal device uses the CP optimization mode, or the terminal device uses both the CP optimization mode and the UP optimization mode.

In a possible design of the tenth aspect, the determining, by the terminal device, an early-data-transmission terminal type supported by a network device includes: receiving, by the terminal device from the network device, information indicating a random access resource used for early data transmission; and determining, by the terminal device based on the information indicating the random access resource used for early data transmission, that the network device supports a terminal device that uses the user plane UP optimization mode in performing early data transmission; or determining, by the terminal device based on the information indicating the random access resource used for early data transmission, that the network device supports a terminal device that uses the control plane CP optimization mode in performing early data transmission; or determining, by the terminal device based on the information indicating the random access resource used for early data transmission, that the network device supports both a terminal device that uses the UP optimization mode and a terminal device that uses the CP optimization mode in performing early data transmission.

In a possible design of the tenth aspect, the determining, by the terminal device, an early-data-transmission terminal type supported by a network device includes: receiving, by the terminal device from the network device, information indicating that the network device supports a terminal device that uses the CP optimization mode; and determining, by the terminal device based on the information indicating that the network device supports a terminal device that uses the CP optimization mode, that the network device supports a terminal device that uses the control plane CP optimization mode in performing early data transmission.

In a possible design of the tenth aspect, the determining, by the terminal device, an early-data-transmission terminal type supported by a network device includes: receiving, by the terminal device from the network device, information indicating that the network device supports a terminal device that uses the UP optimization mode; and determining, by the terminal device based on the information indicating that the network device supports a terminal device that uses the UP optimization mode, that the network device supports a terminal device that uses the UP optimization mode in performing early data transmission.

In a possible design of the tenth aspect, the determining, by the terminal device, an early-data-transmission terminal type supported by a network device includes: receiving, by the terminal device, information indicating that the network device supports a terminal device that uses the UP optimization mode; and when the terminal device receives, from the network device, information indicating a random access resource used for early data transmission, determining, by the terminal device, that the network device supports a terminal device that uses the user plane UP optimization mode in performing early data transmission.

In a possible design of the tenth aspect, the determining, by the terminal device, an early-data-transmission terminal type supported by a network device includes: receiving, by the terminal device, information indicating that the network device supports a terminal device that uses the CP optimization mode; and when the terminal device receives, from the network device, information indicating a random access resource used for early data transmission, determining, by the terminal device, that the network device supports a terminal device that uses the control plane CP optimization mode in performing early data transmission.

In a possible design of the tenth aspect, the determining, by the terminal device, an early-data-transmission terminal type supported by a network device includes: receiving, by the terminal device, information indicating that the network device supports both a terminal device that uses the UP optimization mode and a terminal device that uses the CP optimization mode; and when the terminal device receives, from the network device, information indicating a random access resource used for early data transmission, determining, by the terminal device, that the network device supports both a terminal device that uses the UP optimization mode and a terminal device that uses the CP optimization mode.

In a possible design of the tenth aspect, the determining, by the terminal device, an early-data-transmission terminal type supported by a network device includes: determining, by the terminal device, information about an early-data-transmission terminal type supported by the network device in a specific range, where the specific range includes at least one of a cell, a carrier, or a coverage level of the network device; and when determining that a requirement on the range is met, performing, by the terminal device the following step under triggering: determining, by the terminal device, whether to use the early data transmission mode, based on the early-data-transmission terminal type supported by the network device and the transmission type of the terminal device.

According to an eleventh aspect, an embodiment of this application provides a network device, including: a processing module, configured to determine an early-data-transmission terminal type supported by the network device, where the early-data-transmission terminal type includes at least one of: a terminal device that uses a user plane UP optimization mode performs early data transmission, or a terminal device that uses a control plane CP optimization mode performs early data transmission; and a transmit module, configured to send, to a terminal device, information about the early-data-transmission terminal type supported by the network device.

In the eleventh aspect of this application, the composition modules of the network device may further perform the steps described in the ninth aspect and the possible implementations. For details, refer to the descriptions in the ninth aspect and the possible implementations.

According to a twelfth aspect, an embodiment of this application further provides a terminal device, including: a processing module, configured to determine an early-data-transmission terminal type supported by a network device, where the early-data-transmission terminal type includes at least one of: a terminal device that uses a user plane UP optimization mode performs early data transmission, or a terminal device that uses a control plane CP optimization mode performs early data transmission, where the processing module is configured to determine whether to use an early data transmission mode, based on the early-data-transmission terminal type supported by the network device and a transmission type of the terminal device. The transmission type of the terminal device includes: the terminal device uses the UP optimization mode, the terminal device uses the CP optimization mode, or the terminal device uses both the CP optimization mode and the UP optimization mode.

In a twelfth aspect of this application, the composition module of the terminal device may further perform the steps described in the tenth aspect and the possible implementations. For details, refer to the descriptions in the tenth aspect and the possible implementations.

According to a thirteenth aspect, an apparatus is provided. The apparatus provided in this application has a function of implementing behavior of the terminal device or the network device or the core network device in the foregoing method aspects, and includes corresponding means configured to implement the steps or functions described in the foregoing method aspects. The steps or functions may be implemented by software, hardware (for example, a circuit), or a combination of hardware and software.

In a possible design, the apparatus includes one or more processors and a communications unit. The one or more processors are configured to support the apparatus in performing the corresponding function of the terminal device in the foregoing methods. The communications unit is configured to support the apparatus in communicating with another device, to implement a receiving function and/or a sending function.

Optionally, the apparatus may further include one or more memories, the memory is configured to couple to the processor, and the memory stores a program instruction and/or data that are/is necessary for the apparatus. The one or more memories may be integrated with the processor, or may be separate from the processor. This is not limited in this application.

The apparatus may be an intelligent terminal, a wearable device, or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver or an input/output circuit to receive and send a signal, and the memory is configured to store a computer program. The processor is configured to run the computer program in the memory, to enable the apparatus to perform the method completed by the terminal device in any one of the first aspect or the possible implementations of the first aspect.

In a possible design, the apparatus includes one or more processors and a communications unit. The one or more processors are configured to support the apparatus in performing the corresponding function of the network device in the foregoing methods. The communications unit is configured to support the apparatus in communicating with another device, to implement a receiving function and/or a sending function.

Optionally, the apparatus may further include one or more memories, the memory is configured to couple to the processor, and the memory stores a program instruction and/or data that are/is necessary for the network device. The one or more memories may be integrated with the processor, or may be separate from the processor. This is not limited in this application.

The apparatus may be a base station, a gNB, a TRP, or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver or an input/output circuit to receive and send a signal, and the memory is configured to store a computer program. The processor is configured to run the computer program in the memory, to enable the apparatus to perform the method completed by the network device in any one of the second aspect or the possible implementations of the second aspect.

According to a fourteenth aspect, a system is provided. The system includes the foregoing terminal device, network device, and core network device.

According to a fifteenth aspect, a computer-readable storage medium is provided. The computer-readable storage medium is configured to store a computer program, and the computer program includes an instruction used to perform the method according to any possible implementation in the first aspect to the fourth aspect, the ninth aspect, and the tenth aspect.

According to a sixteenth aspect, a computer program product is provided. The computer program product includes computer program code. When the computer program code is run on a computer, the computer is enabled to perform the method according to any possible implementation in the first aspect to the fourth aspect, the ninth aspect, and the tenth aspect.

DESCRIPTION OF EMBODIMENTS

Embodiments of this application provide an information processing method and an apparatus, to communicate configuration information of a wake-up signal, so that a terminal device reduces paging power consumption of the terminal device through listening to the wake-up signal, and network resource utilization is improved.

Figure 1:
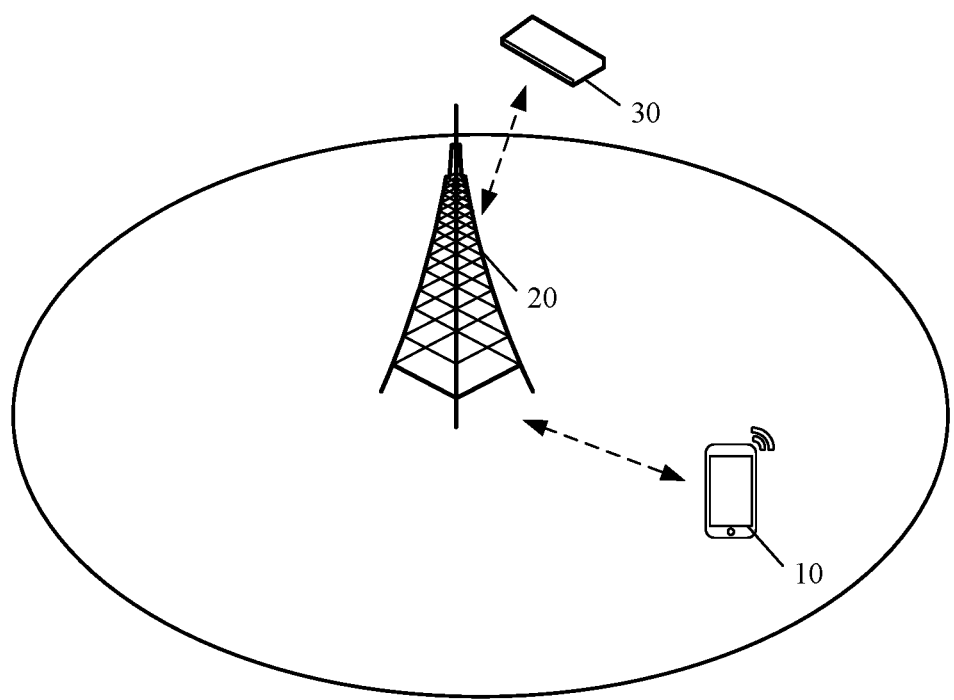
FIG. 1 is a schematic diagram of an information processing system applicable to an information processing method according to an embodiment of this application.

FIG. 1 is a schematic structural diagram of a possible radio access network (RAN) according to an embodiment of this application. The RAN may be a base station access system of a 2G network (to be specific, the RAN includes a base station and a base station controller), may be a base station access system of a 3G network (to be specific, the RAN includes a base station and an RNC), may be a base station access system of a 4G network (to be specific, the RAN includes an eNB and an RNC), or may be a base station access system of a 5G network. A CN may be an MME and/or an S-GW of the 4G network, may be an SGSN or a GGSN of the 3G network, or may be a next generation core network (NG-Core) of the 5G network.

The RAN includes one or more network devices 20. The radio access network may be connected to a core network (CN) device 30. The network device 20 may be any type of device with a wireless transceiver function, or a chip disposed in a device with a wireless transceiver function. The network device 20 includes but is not limited to a base station (for example, a base station BS, a NodeB NodeB, an evolved NodeB eNodeB or eNB, a gNodeB gNodeB or gNB in a fifth generation 5G communications system, a base station in a future communications system, or an access node in a Wi-Fi system, a wireless relay node, or a wireless backhaul node) and the like. The base station may be a macro base station, a micro base station, a femto base station, a small cell, a relay station, or the like. The plurality of base stations may support networks using the foregoing one or more technologies, or a future evolved network. The core network may support networks using the foregoing one or more technologies, or a future evolved network. The base station may include one or more co-site or non-co-site transmission reception points (TRP). The network device 20 may alternatively be a radio controller, a centralized unit (CU), a distributed unit (DU), or the like in a cloud radio access network (CRAN) scenario. The network device may alternatively be a server, a wearable device, a vehicle-mounted device, or the like. That the network device 20 is a base station is used as an example for description in the following. The plurality of network devices 20 may be base stations of a same type or base stations of different types. The base station may communicate with a terminal device 10, or may communicate with a terminal device 10 through a relay station. The terminal 10 may support communication with a plurality of base stations using different technologies. For example, the terminal device may support communication with a base station supporting an LTE network, may support communication with a base station supporting the 5G network, or may support a dual connection to a base station supporting an LTE network and a base station supporting the 5G network. For example, the terminal is connected to a radio access network (RAN) node of a wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (centralized unit, CU) node, a distributed unit (DU) node, or a RAN device including a CU node and a DU node.

The terminal device 10 is also referred to as user equipment (UE), a mobile station (MS), a mobile terminal (MT), a terminal, or the like, and is a device that provides voice and/or data connectivity for a user, or a chip disposed in the device, for example, a handheld device or a vehicle-mounted device having a wireless connection function. Currently, for example, the terminal device is a mobile phone, a tablet, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, and the like.

The core network device 30 may be specifically a mobility management entity (MME) in the 4G network, or may be an access management function (AMF) in the 5G network. The core network device 30 may be a physical entity, a functional entity, or a chip disposed in a physical entity.

Figure 2:
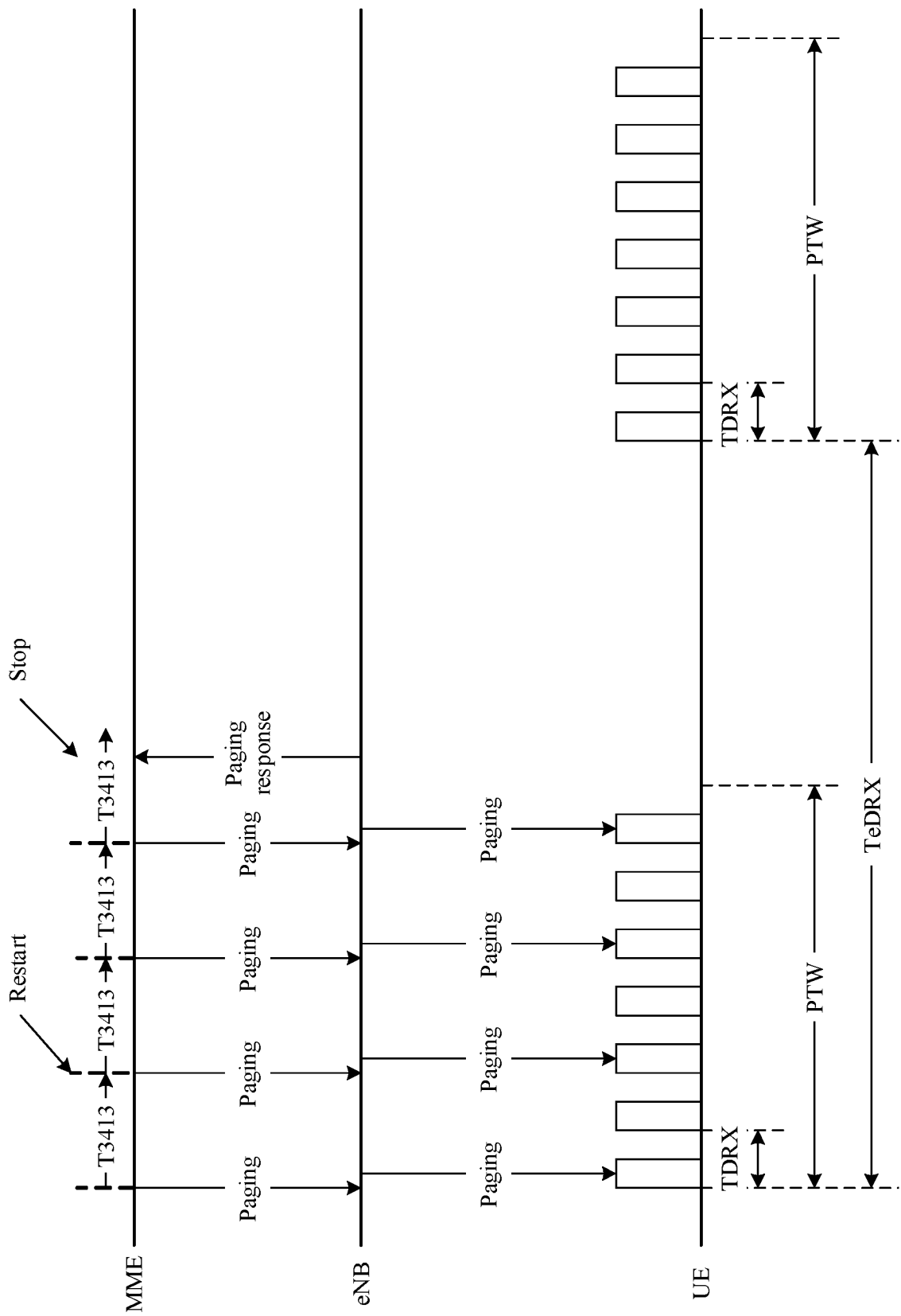
FIG. 2 is a schematic flowchart of paging a terminal device by a core network device applicable to an embodiment of this application.

A paging process in an embodiment of this application is first described by using an example. Paging in an NB-IoT scenario is used as an example. FIG. 2 is a schematic diagram of paging a terminal device by a core network device according to an embodiment of this application. The following configurations are required in the paging process:

The core network device configures, for the terminal device, a paging time window (PTW) length and an extended discontinuous reception (eDRX) cycle TeDRX of the terminal device.

A base station sends, by using a system broadcast, a paging configuration of a cell served by the base station, including a discontinuous reception (DRX) DRX cycle TDRX, a quantity of paging occasions (PO) included in one DRX cycle, and the like, so that the terminal device calculates a PO location in the current cell based on an ID of the terminal device. One eDRX cycle includes one PTW, and one PTW includes several DRX cycles. When this application is applied to another scenario, the time window, the DRX cycle, or the eDRX cycle may be replaced with another term provided that implemented functions are the same or similar.

The following separately describes in detail behavior of each network element in the paging process.

Core network device (for example, an MME): When paging a terminal device, the core network device sends, to the base station, a paging message including an identity ID of the terminal device, and a PTW length and an eDRX cycle of the terminal device. The base station pages the terminal device. After initiating paging, the core network device starts a timer T3413. If the core network device does not receive a paging response from the terminal device before the timer expires, the core network device re-initiates paging and restarts the timer. If receiving a paging response, the core network device stops the timer.

Base station (for example, an eNB): After receiving the paging message of the core network device, the base station pages the terminal device on a corresponding PO, of the terminal device, in each DRX cycle in a PTW of the terminal device, based on the ID of the terminal device, and the PTW length and the eDRX cycle of the terminal device that are carried in the paging message of the core network, and paging configuration information of the base station.

Terminal device (for example, UE): The terminal device wakes up at an interval of TeDRX based on the configuration of the core network device, and listens to paging within the PTW length. Specifically, in the PTW, the terminal device calculates, based on the ID of the terminal device and the paging configuration information broadcast by the base station serving the cell in which the terminal device is located, a unique PO location in each DRX cycle, and listens to the paging message on the corresponding PO. For example, the terminal device may first listen to a physical downlink control channel (PDCCH), and then listen to a paging message on a physical downlink shared channel (PDSCH) based on scheduling information on the PDCCH, to check whether the paging message includes the ID of the terminal device. If the paging message includes the ID of the terminal device, it indicates that the terminal device is paged by a network.

In the foregoing paging procedure, an important principle is that in one PTW, it needs to be ensured that the core network has a plurality of opportunities to attempt to page the terminal device. If the core network device does not have a plurality of opportunities to attempt to page the terminal device, after a paging failure, the core network can page the terminal device only in a next eDRX cycle, resulting in a long delay. For example, the maximum eDRX cycle is 2.91 hours.

To optimize the foregoing paging process, in this embodiment of this application, that the terminal device listens to paging is actually attempting, based on the DRX cycle, to decode, at the corresponding PO location, the PDCCH scrambled by using a radio network temporary identifier, e.g. Paging-Radio Network Temporary Identity (P-RNTI). If the decoding succeeds, the terminal device continues to decode, based on scheduling information on the PDCCH, the paging message on the PDSCH, and further determines whether the paging message includes the ID of the terminal device. In this operation, listening to the PDCCH causes relatively high power consumption, especially when a paging cycle of the terminal device is relatively short, the terminal device frequently listens to the PDCCH for paging. In the embodiments of this application, a wake-up signal is used in the paging process. The wake-up signal indicates, before the PDCCH sent in the PO, whether there is paging to the terminal device on a subsequent PO of the terminal device. If there is paging, the terminal device listens to the PDCCH at a corresponding location; otherwise, the terminal device does not need to listen to the PDCCH. Because the wake-up signal is simple in design, listening to the wake-up signal consumes lower power consumption than listening to the PDCCH. Therefore, if the terminal device is not to be paged, the terminal device needs to listen to only the wake-up signal, and does not need to listen to the PDCCH. This reduces power consumption. The wake-up signal indicates whether there is paging to the terminal on the subsequent PO of the terminal device. If there is paging, the terminal device listens to the PDCCH at the corresponding location; otherwise, the terminal device does not need to listen to the PDCCH.

For example, one wake-up signal is used to indicate whether there is paging to the terminal device on a future PO. If one wake-up signal may be used to indicate whether there is paging to the terminal device on a plurality of future POs, more PDCCHs may not need to be listened to by the terminal, which helps reduce power consumption; and fewer wake-up signals need to be sent by the base station on the plurality of subsequent POs, which helps improve network resource utilization.

However, to implement this, it needs to be ensured there are a plurality of wake-up signals in one PTW, to avoid a paging delay caused by missing a wake-up opportunity and waiting for a next eDRX cycle. The PTW length is configured by the MME, but a location and a periodicity of the wake-up signal are both configured by the base station. Coordinated configuration cannot be ensured between the MME and the base station, and consequently it cannot be ensured that there are a plurality of wake-up signals in one PTW.

In addition, a gain of the wake-up signal mainly lies in a terminal device with a short paging cycle but a very low probability of being paged. There is a very high probability that a terminal with a longer paging cycle and a higher probability of being paged needs to listen to both the wake-up signal and the conventional PDCCH, and consequently a negative gain may be even caused.

Figure 3A:
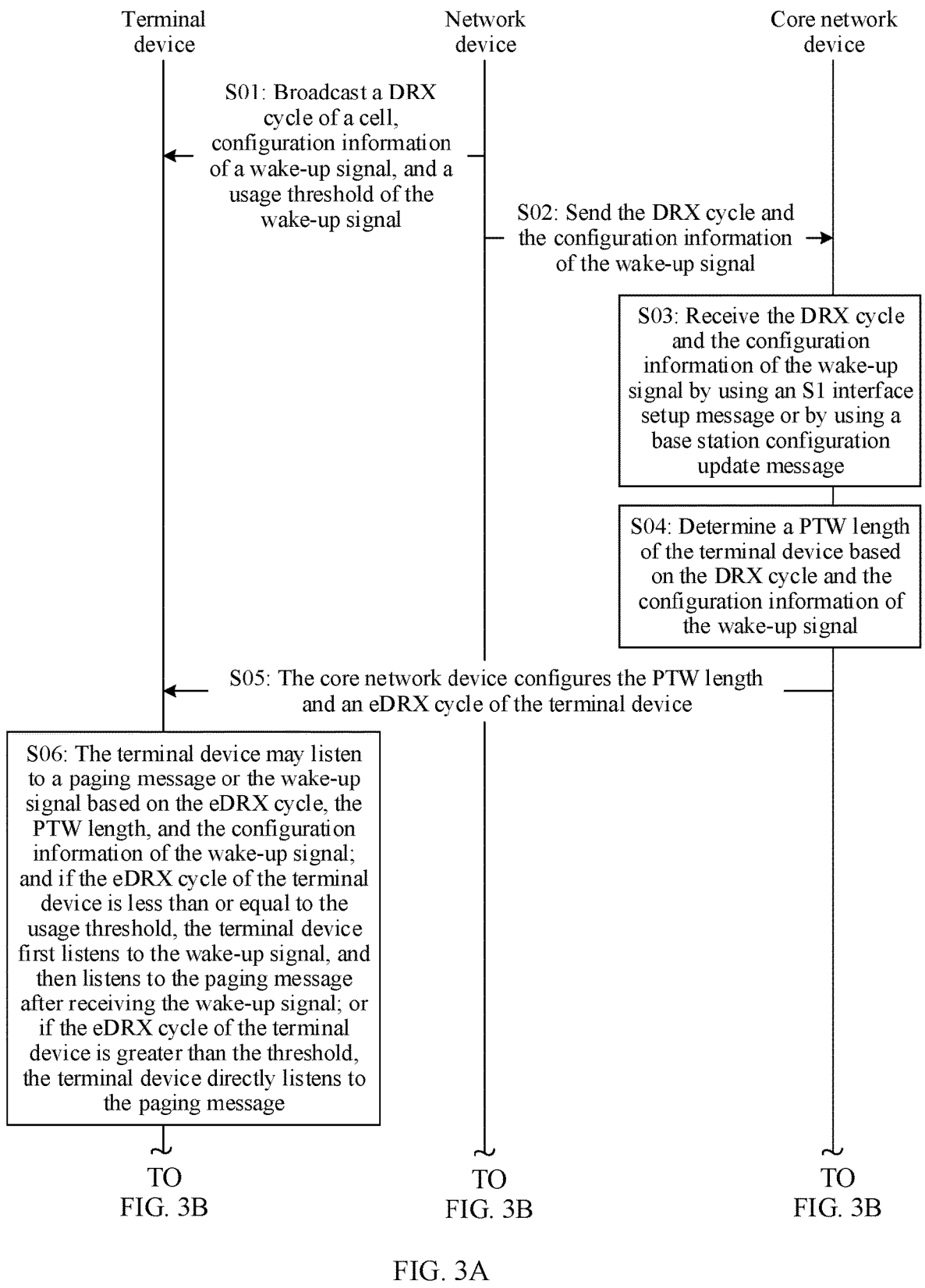
FIG. 3A and FIG. 3B are a schematic flowchart of interaction among a network device, a core network device, and a terminal device in an information processing method applicable to an embodiment of this application.
Figure 3B:
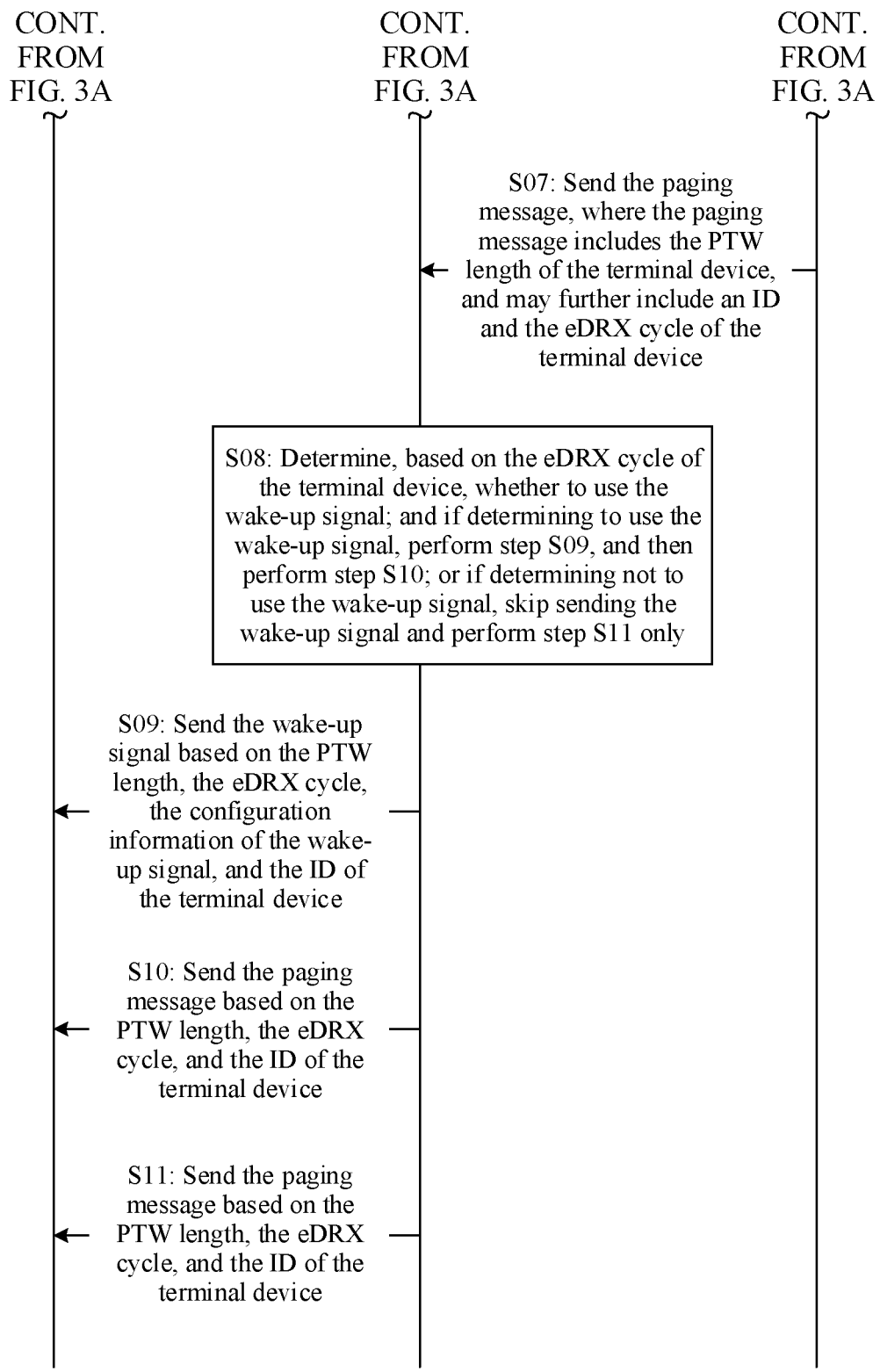

FIG. 3A and FIG. 3B are a schematic flowchart of interaction among a network device, a terminal device, and a core network device according to an embodiment of this application. An information processing method provided in this embodiment of this application mainly includes the following processes:

S01: The network device broadcasts a DRX cycle of a cell, configuration information of a wake-up signal, and a usage threshold of the wake-up signal. In this embodiment of this application, step S01 is merely an example of an execution step of the network device. The network device may alternatively send at least one of the DRX cycle of the cell, the configuration information of the wake-up signal, and the usage threshold of the wake-up signal. This is not limited. The DRX cycle of the cell may be configured by the base station, and each terminal device has one paging occasion within one DRX cycle. The wake-up signal is used to indicate whether to page the terminal device within a time period, and a value of the time period may be determined by the network device.

In this application, the configuration information of the wake-up signal is used to indicate a time interval between two adjacent wake-up signals, or the configuration information of the wake-up signal is used to indicate a time interval between two consecutive times of detecting the wake-up signal by the terminal device. For example, the wake-up signal may have two cases. In a case 1, if the network device sends the wake-up signal, it indicates that the terminal device needs to be woken up; if the network device does not send the wake-up signal, it indicates that the terminal device is not to be woken up. In a case 2, the wake-up signal has at least two states. A state 1 (for example, 01) indicates waking up the terminal device, and a state 2 (for example, 10) indicates not waking up the terminal device.

For example, a function of the wake-up signal is to indicate whether there is paging to the terminal device in the future time period. A signal having a wake-up function may be the wake-up signal. For example, whether the signal exists may be used to indicate whether there is paging in the future time period. If the terminal device detects the wake-up signal at a corresponding location, it means that the network device is to send a paging message. If the terminal device does not detect the wake-up signal, it means that there is no paging message subsequently, and the terminal device attempts to detect the wake-up signal at a next signal location. For another example, different states of the wake-up signal may be used to indicate whether there is a paging message in the future time period. If the terminal device detects a specific signal state, for example, 01, at a corresponding location, it indicates that the paging message is to be received. If the terminal device detects another state, for example, 10, it means that there is no paging message subsequently. In this embodiment of this application, listening overheads caused when the terminal device listens to conventional paging can be reduced by using the wake-up signal. Because the wake-up signal is relatively simple, compared with listening to a PDCCH in the conventional paging, listening to the wake-up signal saves resources. If the terminal device is not paged, the terminal device listens to only the wake-up signal. This saves network resources.

In this application, the time interval between the two adjacent wake-up signals includes at least one of the time interval between the two adjacent wake-up signals or a time interval between possible locations of the two wake-up signals.

The configuration information of the wake-up signal is used to indicate the time interval between the two adjacent wake-up signals. The configuration information may be implemented in a plurality of manners. The following provides descriptions by using examples. For example, the configuration information of the wake-up signal includes at least one of the following information: information indicating a periodicity of the wake-up signal, information indicating a correspondence between the wake-up signal and the DRX cycle, or information indicating the time period. The information indicating the periodicity of the wake-up signal may be specifically periodicity information of the wake-up signal, or other information that can be used to determine a value of the periodicity of the wake-up signal. The information indicating the correspondence between the wake-up signal and the DRX cycle may be specifically information about the correspondence between the wake-up signal and the DRX cycle. For example, the correspondence between the wake-up signal and the DRX cycle may be that one wake-up signal corresponds to a value of a quantity of DRX cycles. For example, a letter x is used to represent the quantity of DRX cycles corresponding to one wake-up signal, and a value of x may be a positive integer such as 1 or 2. The information indicating the time period is a value, of the time period, that indicates that the wake-up signal is used to page the terminal device within the time period. For example, if the time period represents three subframes, the wake-up signal needs to be used to page the terminal device within three subframes. In this embodiment of this application, the usage threshold of the wake-up signal is an eDRX cycle threshold for using the wake-up signal. A value unit of the usage threshold may be a time unit such as second or millisecond, or may be a subframe, a system frame, a super frame, or the like that can reflect time. The usage threshold of the wake-up signal is a threshold for determining whether the wake-up signal is valid. The usage threshold may depend on a network resource status of the network device. If there are many network resources, the usage threshold may be set to a large value. If there are a few network resources, the usage threshold may be set to a small value. For another example, the usage threshold may alternatively depend on distribution of eDRX cycles of terminal devices in a network. When eDRX cycles of b % of the terminals each are less than c, the usage threshold may be set to c. Values of b and c may be determined based on a scenario. The network device and the terminal device may determine, based on the usage threshold of the wake-up signal, whether to use the wake-up signal. If the network device determines to use the wake-up signal, the network device sends the wake-up signal to the terminal device. If the terminal device determines to use the wake-up signal, the terminal device listens to the wake-up signal.

In some embodiments of this application, the configuration information of the wake-up signal further includes information indicating a start location and duration of the wake-up signal in one periodicity.

The start location and the duration of the wake-up signal in one periodicity may be used as the configuration information of the wake-up signal. The start location represents a location at which the wake-up signal starts to be sent in one periodicity. The duration represents a quantity of unit times occupied by the wake-up signal in one periodicity. A signal configuration parameter of the wake-up signal may be more accurately described by using the information indicating the start location and the duration of the wake-up signal in one periodicity.

S02: The network device sends the configuration information of the wake-up signal to a core network device. Further, the network device may further send the DRX cycle.

In this embodiment of this application, step S02 is merely an example of an execution step of the network device. The network device may alternatively send at least one of the DRX cycle, and the configuration information of the wake-up signal. This is not limited. The network device sends the DRX cycle to the core network device, and the core network device can obtain a value parameter of the DRX cycle. The network device sends the configuration information of the wake-up signal to the core network device, and the core network device can obtain the configuration information of the wake-up signal, so that the core network device can determine the signal configuration parameter of the wake-up signal.

In some embodiments of this application, that the network device sends the configuration information of the wake-up signal to a core network device includes:

The network device sends an interface setup request message to the core network device, where the interface setup request message carries the configuration information of the wake-up signal; or the network device sends a configuration update message of the network device to the core network device, where the configuration update message carries the configuration information of the wake-up signal.

The interface setup request message is a request message sent by the network device when an interface is set up between the network device and the core network device. The interface setup request message is used to carry the configuration information of the wake-up signal. For example, a field may be added to the interface setup request message to carry the configuration information of the wake-up signal, or an extensible field in the interface setup request message is used to carry the configuration information of the wake-up signal. The configuration update message of the network device indicates a notification message sent by the network device to the core network device when the network device has a configuration update. For example, a field may be added to the configuration update message to carry the configuration information of the wake-up signal, or an extensible field in the configuration update message is used to carry the configuration information of the wake-up signal. The following step S03 is used as an example for description.

S03: The core network device receives the configuration information of the wake-up signal by using an S1 interface setup message or by using a base station configuration update message. Further, the core network device receives the DRX cycle by using the S1 interface setup message or by using the base station configuration update message.

For example, the base station may send the configuration information of the wake-up signal to the core network device in a plurality of procedures or messages. For example, the base station sends the configuration information of the wake-up signal to the core network device in a corresponding interface setup message (for example, an S1 interface setup request message) when the interface between the base station and the core network is set up, or the base station sends the configuration information of the wake-up signal to the core network device in the base station configuration update message in a base station configuration update process after the interface is set up.

S04: The core network device determines a PTW length of the terminal device based on the configuration information of the wake-up signal.

In this embodiment of this application, step S04 is merely an example of an execution step of the core network device. The core network device may alternatively determine the PTW length of the terminal device based on the DRX cycle and the configuration information of the wake-up signal. This is not limited. For example, the core network device may determine the PTW length of the terminal device based on the configuration information of the wake-up signal. The PTW length determined by the core network device is greater than the time interval between the two adjacent wake-up signals. In other words, there is more than one wake-up signal in one PTW. In this way, a paging delay caused by missing a wake-up opportunity and waiting for a next eDRX cycle is avoided, and network resource utilization is improved.

In some embodiments of this application, the configuration information of the wake-up signal includes the information indicating the periodicity of the wake-up signal, and that the core network device determines a PTW length of the terminal device based on the configuration information of the wake-up signal includes:

The core network device determines the PTW length based on the periodicity of the wake-up signal, where the PTW length is greater than the value of the periodicity of the wake-up signal.

The core network device determines the PTW length based on the value of the periodicity of the wake-up signal, and the PTW length determined by the core network device is greater than the value of the periodicity of the wake-up signal. For example, the PTW length may be greater than or equal to a result obtained by multiplying a by the value of the periodicity of the wake-up signal. In this way, there may be at least a wake-up signals in one PTW length. A value of a may be a positive integer. For example, when the value of a is 2, there are two wake-up signals within the PTW length calculated by the core network device. For another example, when the value of a is 3, there are three wake-up signals within the PTW length calculated by the core network device.

In some embodiments of this application, the configuration information of the wake-up signal includes the information indicating the correspondence between the wake-up signal and the discontinuous reception DRX cycle, and that the core network device determines a PTW length of the terminal device based on the configuration information of the wake-up signal includes:

The core network device determines that the correspondence between the wake-up signal and the discontinuous reception DRX cycle is that one wake-up signal corresponds to x DRX cycles, where x is a positive integer; and
   the core network device determines the PTW length based on the correspondence between the wake-up signal and the discontinuous reception DRX cycle, where the PTW length is greater than a result obtained by multiplying x by the value of the DRX cycle.

The core network device determines the PTW length based on the correspondence between the wake-up signal and the discontinuous reception DRX cycle, one wake-up signal corresponds to x DRX cycles, and x is a positive integer. For example, the value of x is 2. The PTW length determined by the core network device is greater than the result obtained by multiplying x by the value of the DRX cycle. For example, the PTW length may be greater than or equal to a result obtained by multiplying the value of the DRX cycle by a result obtained by multiplying a by x. The result obtained by multiplying x by the value of the DRX cycle corresponds to one wake-up signal. In this way, there may be at least a wake-up signals in one PTW length. A value of a may be a positive integer. For example, when the value of a is 2, there are two wake-up signals within the PTW length calculated by the core network device. For another example, when the value of a is 3, there are three wake-up signals within the PTW length calculated by the core network device.

In some embodiments of this application, the configuration information of the wake-up signal includes the information indicating the time period, and that the core network device determines a paging time window PTW length of the terminal device based on the configuration information of the wake-up signal includes:

The core network device determines the PTW length based on information about the time period, where the PTW length is greater than the value of the time period.

The core network device determines the PTW length based on the value of the time period, and the PTW length determined by the core network device is greater than the value of the time period of the wake-up signal. For example, the PTW length may be greater than or equal to a result obtained by multiplying a by the value of the time period of the wake-up signal. In this way, there may be at least a wake-up signals in one PTW length. A value of a may be a positive integer. For example, when the value of a is 2, there are two wake-up signals within the PTW length calculated by the core network device. For another example, when the value of a is 3, there are three wake-up signals within the PTW length calculated by the core network device.

S05: The core network device configures the PTW length of the terminal device.

In this embodiment of this application, step S05 is merely an example of an execution step of the core network device. The core network device may alternatively configure the PTW length and the eDRX cycle of the terminal device. This is not limited. The core network device may configure the determined PTW length and eDRX cycle of the terminal device for the terminal device. For example, the core network device sends the PTW length and the eDRX cycle of the terminal device to the terminal device in a transparent transmission manner.

S06: The terminal device may listen to the paging message or the wake-up signal based on the eDRX cycle, the PTW length, and the configuration information of the wake-up signal. If the eDRX cycle of the terminal device is less than or equal to the usage threshold, the terminal device first listens to the wake-up signal, and then listens to the paging message after receiving the wake-up signal. If the eDRX cycle of the terminal device is greater than the usage threshold, the terminal device directly listens to the paging message.

The terminal device may obtain the usage threshold of the wake-up signal by using step S01, and the terminal device obtains the PTW length and the eDRX cycle of the terminal device by using step S05. Then, the terminal device may determine whether the eDRX cycle of the terminal device is less than or equal to the usage threshold. If the eDRX cycle of the terminal device is less than or equal to the usage threshold, the terminal device first listens to the wake-up signal, and then listens to the paging message after receiving the wake-up signal. If the eDRX cycle of the terminal device is greater than the threshold, the terminal device directly listens to the paging message. Directly listening to the paging message means that the terminal device no longer listens to the wake-up signal, but listens to the paging message based on the PTW length and the eDRX cycle.

It should be noted that in some embodiments of this application, the terminal device may alternatively determine whether the eDRX cycle of the terminal device is less than the usage threshold. If the eDRX cycle of the terminal device is less than the usage threshold, the terminal device first listens to the wake-up signal, and then listens to the paging message after receiving the wake-up signal. If the eDRX cycle of the terminal device is greater than or equal to the usage threshold, the terminal device directly listens to the paging message. Behavior performed by the terminal device when the eDRX cycle is equal to the usage threshold may be determined based on an application scenario. An example is used only for description herein.

S07: The core network device sends the paging message to the network device, where the paging message includes the PTW length of the terminal device. Further, the paging message may further include an ID of the terminal device and/or the eDRX cycle.

In this embodiment of this application, when the core network device needs to page the terminal device, the core network device may send the paging message to the network device.

S08: The network device determines, based on the eDRX cycle of the terminal device, whether to use the wake-up signal; and if determining to use the wake-up signal, the network device performs step S09, and then performs step S10; or if determining not to use the wake-up signal, the network device skips sending the wake-up signal, and performs only step S11.

S09: The network device sends the wake-up signal to the terminal device based on the PTW length, the eDRX cycle, the configuration information of the wake-up signal, and the ID of the terminal device.

S10: The network device sends the paging message to the terminal device based on the PTW length, the eDRX cycle, and the ID of the terminal device.

S11: The network device sends the paging message to the terminal device based on the PTW length, the eDRX cycle, and the ID of the terminal device.

After the network device receives the paging message from the core network device, the network device may determine whether the eDRX cycle of the terminal device is less than or equal to the usage threshold. If the eDRX cycle of the terminal device is less than or equal to the usage threshold, the network device may first send the wake-up signal, and then send the paging message. If the eDRX cycle of the terminal device is greater than the threshold, the network device directly sends the paging message. Directly sending the paging message means that the network device no longer sends a listening signal (i.e. the wake-up signal), but sends the paging message based on the PTW length and the eDRX cycle.

It can be learned from the foregoing example descriptions in this embodiment that, in this embodiment of this application, the network device may determine the configuration information of the wake-up signal, the wake-up signal is used to indicate whether to page the terminal device within the time period, the configuration information is used to indicate the time interval between the two adjacent wake-up signals, and the network device sends the configuration information of the wake-up signal to the core network device. The core network device may receive the configuration information of the wake-up signal from the network device. Therefore, in this embodiment of this application, the configuration information of the wake-up signal can be communicated. After receiving the configuration information of the wake-up signal, the core network device may complete paging configuration of the core network device for the terminal device based on the configuration information, so that the terminal device reduces paging power consumption of the terminal device through listening to the wake-up signal, and network resource utilization is improved.

Figure 4:
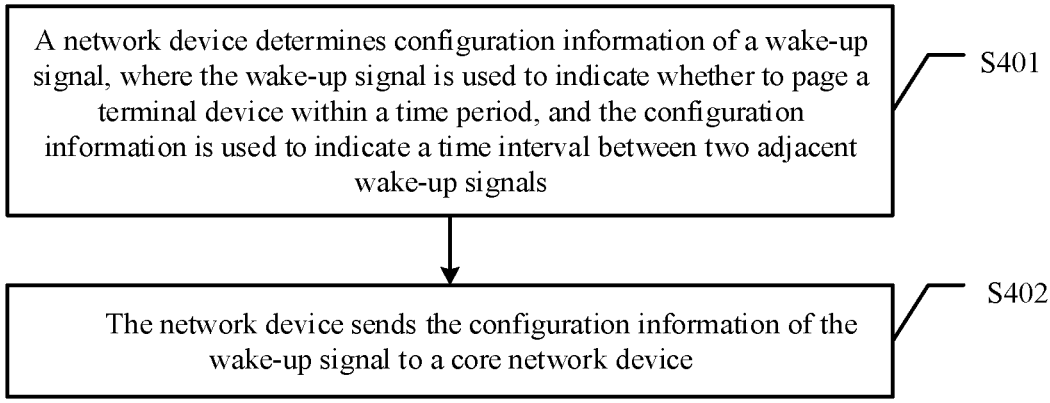
FIG. 4 is a schematic flowchart of an information processing method according to an embodiment of this application.

The following describes the information processing method provided in the embodiments of this application from perspectives of a network device, a core network device, and a terminal device. First, referring to FIG. 4, an embodiment of this application provides an information processing method, including the following steps.

S401: A network device determines configuration information of a wake-up signal, where the wake-up signal is used to indicate whether to page a terminal device within a time period, and the configuration information is used to indicate a time interval between two adjacent wake-up signals.

In this embodiment of this application, the network device may configure the wake-up signal, and after completing configuration on the wake-up signal, the configuration information of the wake-up signal may be generated. Alternatively, the network device may obtain the configuration information of the wake-up signal by reading a default configuration parameter of the network device.

In this embodiment of this application, the configuration information of the wake-up signal is used to indicate the time interval between the two adjacent wake-up signals. The configuration information may be implemented in a plurality of manners. The following provides descriptions by using examples. For example, the configuration information of the wake-up signal includes at least one of the following information: information indicating a periodicity of the wake-up signal, information indicating a correspondence between the wake-up signal and a DRX cycle, or information indicating the time period. The information indicating the periodicity of the wake-up signal may be specifically periodicity information of the wake-up signal, or other information that can be used to determine a value of the periodicity of the wake-up signal. The information indicating the correspondence between the wake-up signal and the DRX cycle may be specifically information about the correspondence between the wake-up signal and the DRX cycle. For example, the correspondence between the wake-up signal and the DRX cycle may be that one wake-up signal corresponds to a value of a quantity of DRX cycles. For example, a letter x is used to represent the quantity of DRX cycles corresponding to one wake-up signal, and a value of x may be a positive integer such as 1 or 2. The information indicating the time period is a value, of the time period, that indicates that the wake-up signal is used to page the terminal device within the time period. For example, if the time period represents three subframes, the wake-up signal needs to be used to page the terminal device within three subframes. In this embodiment of this application, a usage threshold of the wake-up signal is an eDRX cycle threshold for using the wake-up signal. A value unit of the usage threshold may be a time unit such as second or millisecond, or may be a subframe, a system frame, a super frame, or the like that can reflect time.

In some embodiments of this application, the configuration information of the wake-up signal further includes information indicating a start location and duration of the wake-up signal in one periodicity.

The start location and the duration of the wake-up signal in one periodicity may be used as the configuration information of the wake-up signal. The start location represents a location at which the wake-up signal starts to be sent in one periodicity. The duration represents a quantity of unit times occupied by the wake-up signal in one periodicity. A signal configuration parameter of the wake-up signal may be more accurately described by using the information indicating the start location and the duration of the wake-up signal in one periodicity.

S402: The network device sends the configuration information of the wake-up signal to a core network device.

In some embodiments of this application, after the network device obtains the configuration information of the wake-up signal, the network device sends the configuration information of the wake-up signal to the core network device. For example, the network device may send the configuration information of the wake-up signal through an interface between the network device and the core network device, for example, send the configuration information of the wake-up signal through an S1 interface.

In some embodiments of this application, the information processing method provided in this embodiment of this application may further include the following step:

The network device sends, to the core network device, information indicating the DRX cycle.

The DRX cycle may be configured by the base station, and each terminal device has one paging occasion within one DRX cycle. The information indicating the DRX cycle may be specifically configuration information of the DRX cycle or other information that can be used to determine a value of the DRX cycle. The network device sends, to the core network device, the information indicating the DRX cycle, so that the core network device can obtain the information indicating the DRX cycle, and the core network device can obtain a value parameter of the DRX cycle based on the information indicating the DRX cycle.

In some embodiments of this application, that the network device sends the configuration information of the wake-up signal to a core network device includes:

The network device sends an interface setup request message to the core network device, where the interface setup request message carries the configuration information of the wake-up signal; or the network device sends a configuration update message of the network device to the core network device, where the configuration update message carries the configuration information of the wake-up signal.

The interface setup request message is a request message sent by the network device when an interface is set up between the network device and the core network device. The interface setup request message is used to carry the configuration information of the wake-up signal. For example, a field may be added to the interface setup request message to carry the configuration information of the wake-up signal, or an extensible field in the interface setup request message is used to carry the configuration information of the wake-up signal. The configuration update message of the network device indicates a notification message sent by the network device to the core network device when the network device has a configuration update. For example, a field may be added to the configuration update message to carry the configuration information of the wake-up signal, or an extensible field in the configuration update message is used to carry the configuration information of the wake-up signal.

It can be learned from the foregoing example descriptions in this embodiment that, in this embodiment of this application, the network device may determine the configuration information of the wake-up signal, the wake-up signal is used to indicate whether to page the terminal device within the time period, the configuration information is used to indicate the time interval between the two adjacent wake-up signals, and the network device sends the configuration information of the wake-up signal to the core network device. The core network device may receive the configuration information of the wake-up signal from the network device. Therefore, in this embodiment of this application, the configuration information of the wake-up signal can be communicated. After receiving the configuration information of the wake-up signal, the core network device may complete paging configuration of the core network device for the terminal device based on the configuration information, so that the terminal device reduces paging power consumption of the terminal device through listening to the wake-up signal, and network resource utilization is improved.

Figure 5:
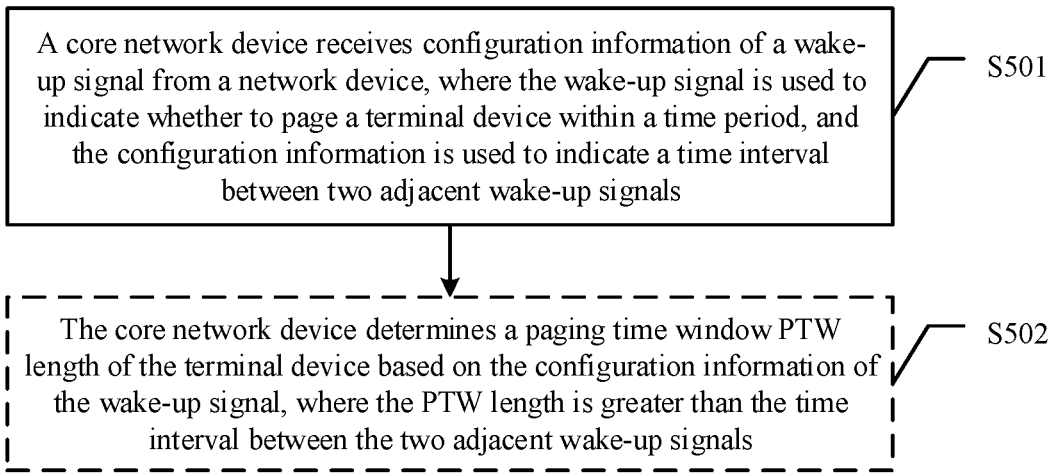
FIG. 5 is a schematic flowchart of another information processing method according to an embodiment of this application.

The foregoing embodiment describes, from the perspective of the network device, the information processing method provided in the embodiments of this application. The following describes, from a perspective of a core network device, the information processing method provided in the embodiments of this application. Referring to FIG. 5, an embodiment of this application provides an information processing method, including the following steps.

S501: The core network device receives configuration information of a wake-up signal from a network device, where the wake-up signal is used by the network device to indicate whether to page a terminal device within a time period, and the configuration information is used to indicate a time interval between two adjacent wake-up signals.

In this embodiments of this application, the core network device receives the configuration information of the wake-up signal from the network device. For example, the core network device may receive the configuration information of the wake-up signal through an interface between the network device and the core network device, for example, receive the configuration information of the wake-up signal through an S1 interface.

In this embodiment of this application, the configuration information of the wake-up signal is used to indicate the time interval between the two adjacent wake-up signals. The configuration information may be implemented in a plurality of manners. The following provides descriptions by using examples. For example, the configuration information of the wake-up signal includes at least one of the following information: information indicating a periodicity of the wake-up signal, information indicating a correspondence between the wake-up signal and a DRX cycle, or information indicating the time period. The information indicating the periodicity of the wake-up signal may be specifically periodicity information of the wake-up signal, or other information that can be used to determine a value of the periodicity of the wake-up signal. The information indicating the correspondence between the wake-up signal and the DRX cycle may be specifically information about the correspondence between the wake-up signal and the DRX cycle. For example, the correspondence between the wake-up signal and the DRX cycle may be that one wake-up signal corresponds to a value of a quantity of DRX cycles. For example, a letter x is used to represent the quantity of DRX cycles corresponding to one wake-up signal, and a value of x may be a positive integer such as 1 or 2. The information indicating the time period is a value, of the time period, that indicates that the wake-up signal is used to page the terminal device within the time period. For example, if the time period represents three subframes, the wake-up signal needs to be used to page the terminal device within three subframes. In this embodiment of this application, a usage threshold of the wake-up signal is an eDRX cycle threshold for using the wake-up signal. A value unit of the usage threshold may be a time unit such as second or millisecond, or may be a subframe, a system frame, a super frame, or the like that can reflect time.

In some embodiments of this application, in step S501, that the core network device receives configuration information, of a wake-up signal from a network device includes:

The core network device receives an interface setup request message from the network device, where the interface setup request message carries the configuration information of the wake-up signal; or the network device receives a configuration update message of the network device from the network device, where the configuration update message carries the configuration information of the wake-up signal.

The core network device may receive the interface setup request message from the network device, and the interface setup request message is a request message sent by the network device when an interface is set up between the network device and the core network device. The interface setup request message is used to carry the configuration information of the wake-up signal. For example, a field may be added to the interface setup request message to carry the configuration information of the wake-up signal, or an extensible field in the interface setup request message is used to carry the configuration information of the wake-up signal. The core network device may alternatively receive the configuration update message of the network device from the network device. The configuration update message of the network device indicates a notification message sent by the network device to the core network device when the network device has a configuration update. For example, a field may be added to the configuration update message to carry the configuration information of the wake-up signal, or an extensible field in the configuration update message is used to carry the configuration information of the wake-up signal.

In some embodiments of this application, the information processing method provided in this embodiment of this application may further include the following step:

S502: The core network device determines a PTW length of the terminal device based on the configuration information of the wake-up signal, where the PTW length is greater than the time interval between the two adjacent wake-up signals.

The core network device may determine the PTW length of the terminal device based on the configuration information of the wake-up signal. The PTW length determined by the core network device is greater than the time interval between the two adjacent wake-up signals. In other words, there is more than one wake-up signal in one PTW. In this way, a paging delay caused by missing a wake-up opportunity and waiting for a next eDRX cycle is avoided, and network resource utilization is improved.

In some embodiments of this application, the configuration information of the wake-up signal includes the information indicating the periodicity of the wake-up signal, and in step S502, that the core network device determines a PTW length of the terminal device based on the configuration information of the wake-up signal includes:

The core network device determines the PTW length based on the periodicity of the wake-up signal, where the PTW length is greater than the value of the periodicity of the wake-up signal.

The core network device determines the PTW length based on the value of the periodicity of the wake-up signal, and the PTW length determined by the core network device is greater than the value of the periodicity of the wake-up signal. For example, the PTW length may be greater than or equal to a result obtained by multiplying a by the value of the periodicity of the wake-up signal. In this way, there may be at least a wake-up signals in one PTW length. A value of a may be a positive integer. For example, when the value of a is 2, there are two wake-up signals within the PTW length calculated by the core network device. For another example, when the value of a is 3, there are three wake-up signals within the PTW length calculated by the core network device.

In some embodiments of this application, the configuration information of the wake-up signal includes the information indicating the correspondence between the wake-up signal and the discontinuous reception DRX cycle, and in step S502, that the core network device determines a PTW length of the terminal device based on the configuration information of the wake-up signal includes:

The core network device determines that the correspondence between the wake-up signal and the discontinuous reception DRX cycle is that one wake-up signal corresponds to x DRX cycles, where x is a positive integer; and
the core network device determines the PTW length based on the correspondence between the wake-up signal and the discontinuous reception DRX cycle, where the PTW length is greater than a result obtained by multiplying x by the value of the DRX cycle.

The core network device determines the PTW length based on the correspondence between the wake-up signal and the discontinuous reception DRX cycle, one wake-up signal corresponds to x DRX cycles, and x is a positive integer. For example, the value of x is 2. The PTW length determined by the core network device is greater than the result obtained by multiplying x by the value of the DRX cycle. For example, the PTW length may be greater than or equal to a result obtained by multiplying the value of the DRX cycle by a result obtained by multiplying a by x. The result obtained by multiplying x by the value of the DRX cycle corresponds to one wake-up signal. In this way, there may be at least a wake-up signals in one PTW length. A value of a may be a positive integer. For example, when the value of a is 2, there are two wake-up signals within the PTW length calculated by the core network device. For another example, when the value of a is 3, there are three wake-up signals within the PTW length calculated by the core network device.

In some embodiments of this application, the configuration information of the wake-up signal includes the information indicating the time period, and in step S502, that the core network device determines a paging time window PTW length of the terminal device based on the configuration information of the wake-up signal includes:

The core network device determines the PTW length based on information about the time period, where the PTW length is greater than the value of the time period.

The core network device determines the PTW length based on the value of the time period, and the PTW length determined by the core network device is greater than the value of the time period of the wake-up signal. For example, the PTW length may be greater than or equal to a result obtained by multiplying a by the value of the time period of the wake-up signal. In this way, there may be at least a wake-up signals in one PTW length. A value of a may be a positive integer. For example, when the value of a is 2, there are two wake-up signals within the PTW length calculated by the core network device. For another example, when the value of a is 3, there are three wake-up signals within the PTW length calculated by the core network device.

In some embodiments of this application, the information processing method provided in this embodiment of this application may further include:

The core network device sends a paging message to the network device, where the paging message includes an eDRX cycle.

The core network device may send the determined eDRX cycle of the terminal device to the network device, so that the network device can receive the eDRX cycle. In this way, the network device may compare the eDRX cycle with the usage threshold of the wake-up signal, to determine a value relationship between the eDRX cycle and the usage threshold of the wake-up signal, and then determine whether to use the wake-up signal.

In some embodiments of this application, the information processing method provided in this embodiment of this application may further include the following steps:

The core network device sends, to the terminal device, information indicating the PTW length; and/or
the core network device sends, to the network device, the paging message for the terminal device, where the paging message includes the information indicating the PTW length.

The core network device may configure the determined PTW length of the terminal device for the terminal device. For example, the core network device sends the PTW length of the terminal device to the terminal device in a transparent transmission manner, so that the terminal device can determine whether need to listen to the wake-up signal within the PTW length, or determine whether need to listen to a paging signal within the PTW length. The core network device may alternatively send, to the network device, the paging message for the terminal device, where the paging message includes the information indicating the PTW length. In this way, the network device can determine whether need to send the wake-up signal within the PTW length, or determine whether need to send the paging signal within the PTW length.

It can be learned from the foregoing example descriptions in this embodiment that, in this embodiment of this application, the core network device may receive the configuration information of the wake-up signal from the network device, the wake-up signal is used to indicate whether to page the terminal device within the time period, and the configuration information is used to indicate the time interval between the two adjacent wake-up signals. Therefore, in this embodiment of this application, the configuration information of the wake-up signal can be communicated. After receiving the configuration information of the wake-up signal, the core network device may complete paging configuration of the core network device for the terminal device based on the configuration information, so that the terminal device reduces paging power consumption of the terminal device through listening to the wake-up signal, and network resource utilization is improved.

Figure 6:
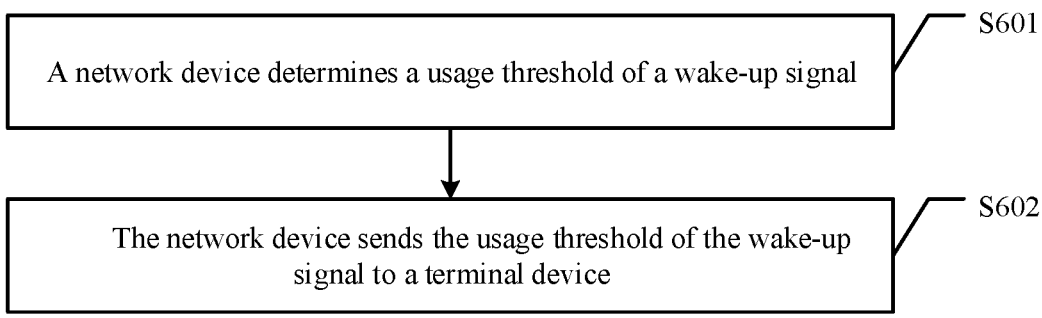
FIG. 6 is a schematic flowchart of another information processing method according to an embodiment of this application.

The foregoing embodiment describes, from the perspective of the network device, the information processing method provided in the embodiments of this application. The following describes another information processing method performed by the network device. Referring to FIG. 6, an embodiment of this application provides an information processing method, including the following steps.

S601: The network device determines a usage threshold of a wake-up signal.

In this embodiment of this application, the usage threshold of the wake-up signal is a threshold for determining whether the wake-up signal is valid. The wake-up signal may be used to optimize a terminal device with a short paging cycle but a relatively low paging frequency. The usage threshold of the wake-up signal may be set based on a currently available network resource and a paging cycle of a terminal device in a network. For example, the usage threshold may depend on a network resource status of the network device. If there are more network resources, a larger value of the usage threshold may be set. If there are fewer network resources, a smaller value of the usage threshold may be set. For another example, the usage threshold may alternatively depend on distribution of eDRX cycles of terminal devices in the network. When eDRX cycles of b % of the terminals each are less than c, the usage threshold may be set to c. Values of b and c may be determined based on a scenario. The network device and the terminal device may determine, based on the usage threshold of the wake-up signal, whether to use the wake-up signal. If the network device determines to use the wake-up signal, the network device sends the wake-up signal to the terminal device. If the terminal device determines to use the wake-up signal, the terminal device listens to the wake-up signal.

S602: The network device sends the usage threshold of the wake-up signal to the terminal device.

In some embodiments of this application, after the network device obtains the usage threshold of the wake-up signal, the network device sends the usage threshold of the wake-up signal to the terminal device. For example, the network device may send the usage threshold of the wake-up signal through an air interface between the network device and the terminal device.

In some embodiments of this application, the information processing method provided in this embodiment of this application further includes:

The network device receives a paging message from a core network device, where the paging message includes an eDRX cycle; and the network device sends the wake-up signal to the terminal device when the network device determines that the eDRX cycle is less than or equal to the usage threshold of the wake-up signal.

The core network device may send the determined eDRX cycle of the terminal device to the network device, and the network device may receive the eDRX cycle. In this way, the network device may compare the eDRX cycle with the usage threshold of the wake-up signal, to determine a value relationship between the eDRX cycle and the usage threshold of the wake-up signal, and then determine whether to use the wake-up signal. When determining that the eDRX cycle is less than or equal to the usage threshold of the wake-up signal, the network device sends the wake-up signal to the terminal device, and the network device can wake up the terminal device by using the wake-up signal. Then, the network device may page the terminal device. In this way, when the terminal device does not detect the wake-up signal through listening, the terminal device does not listen to the paging message from the network device until detecting the wake-up signal through listening. In this way, network resources can be saved.

In some embodiments of this application, that the network device sends the usage threshold of the wake-up signal to the terminal device includes:

The network device broadcasts the usage threshold of the wake-up signal.

The network device may send a broadcast message to the terminal device, and the broadcast message carries the usage threshold of the wake-up signal. After receiving the broadcast message, all terminal devices in a cell served by the network device may determine the usage threshold of the wake-up signal by using the broadcast message. The network device broadcasts the usage threshold of the wake-up signal, thereby effectively improving information sending efficiency.

In some embodiments of this application, the information processing method provided in this embodiment of this application further includes:

The network device receives, from the core network device, the paging message for the terminal device, where the paging message includes information indicating a PTW length of the terminal device, and the PTW length is greater than a time interval between two adjacent wake-up signals.

The core network device may configure the determined PTW length of the terminal device for the terminal device. For example, the core network device sends the PTW length of the terminal device to the terminal device in a transparent transmission manner, so that the terminal device can determine whether need to listen to the wake-up signal within the PTW length, or determine whether need to listen to a paging signal within the PTW length.

It can be learned from the foregoing example descriptions in this embodiment that, in this embodiment of this application, the network device sends the usage threshold of the wake-up signal to the terminal device. Therefore, in this embodiment of this application, the usage threshold of the wake-up signal can be communicated. After receiving the usage threshold of the wake-up signal, the terminal device may determine, based on the usage threshold and the eDRX cycle, whether to listen to the wake-up signal. When the eDRX cycle of the terminal device is less than or equal to the usage threshold of the wake-up signal, the terminal device listens to the wake-up signal, so that the terminal device reduces paging power consumption of the terminal device through listening to the wake-up signal, and network resource utilization is improved.

Figure 7:
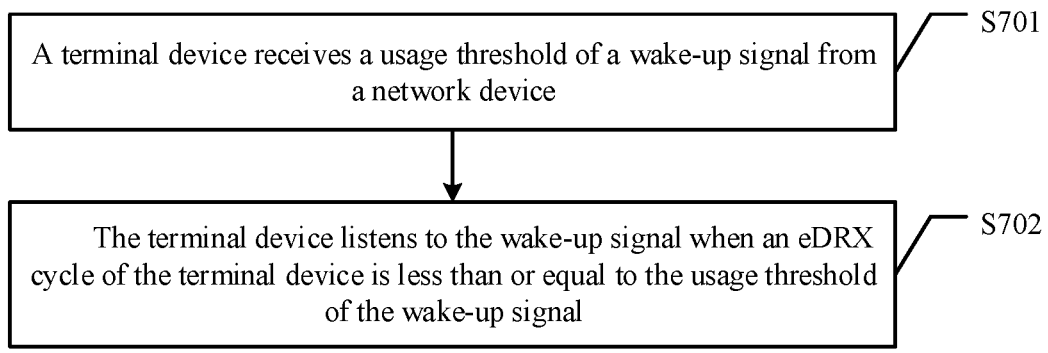
FIG. 7 is a schematic flowchart of another information processing method according to an embodiment of this application.

The foregoing embodiment describes, from the perspectives of the network device and the core network device, the information processing method provided in the embodiments of this application. The following describes, from a perspective of a terminal device, the information processing method provided in the embodiments of this application. Referring to FIG. 7, an embodiment of this application provides an information processing method, including the following steps.

S701: The terminal device receives a usage threshold of a wake-up signal from a network device.

In this embodiment of this application, the terminal device receives the usage threshold, of the wake-up signal, that is sent by the network device. For example, the terminal device may receive the usage threshold of the wake-up signal through an air interface between the network device and the terminal device.

In some embodiments of this application, that the terminal device receives a usage threshold of a wake-up signal from a network device includes:

The terminal device receives the usage threshold of the wake-up signal by using a broadcast message sent by the network device.

The network device may send the broadcast message to the terminal device, and the broadcast message carries the usage threshold of the wake-up signal. After receiving the broadcast message, all terminal devices in a cell served by the network device may determine the usage threshold of the wake-up signal by using the broadcast message. The network device broadcasts the usage threshold of the wake-up signal, thereby effectively improving information sending efficiency.

S702: The terminal device listens to the wake-up signal when an eDRX cycle of the terminal device is less than or equal to the usage threshold of the wake-up signal.

The terminal device may determine whether the eDRX cycle of the terminal device is less than or equal to the usage threshold. If the eDRX cycle of the terminal device is less than or equal to the usage threshold, the terminal device first listens to the wake-up signal, and then listens to a paging message after receiving the wake-up signal.

In some embodiments of this application, the information processing method provided in this embodiment of this application further includes:

The terminal device listens to the paging message from the network device when the eDRX cycle of the terminal device is greater than the usage threshold of the wake-up signal.

If the eDRX cycle of the terminal device is greater than the threshold, the terminal device directly listens to the paging message. Directly listening to the paging message means that the terminal device no longer listens to the wake-up signal, but listens to the paging message based on the PTW length and the eDRX cycle.

In some embodiments of this application, the information processing method provided in this embodiment of this application further includes:

When detecting the wake-up signal through listening, the terminal device listens to the paging message from the network device within a time period indicated by the wake-up signal.

When determining that the eDRX cycle is less than or equal to the usage threshold of the wake-up signal, the network device sends the wake-up signal to the terminal device, and the network device can wake up the terminal device by using the wake-up signal. Then, the network device may page the terminal device. In this way, when the terminal device does not detect the wake-up signal through listening, the terminal device does not listen to the paging message from the network device until detecting the wake-up signal through listening. In this way, network resources can be saved.

In some embodiments of this application, the information processing method provided in this embodiment of this application further includes:

The terminal device receives, from a core network device, information indicating a PTW length, where the PTW length is greater than a time interval between two adjacent wake-up signals.

The core network device may configure the determined PTW length of the terminal device for the terminal device. For example, the core network device sends the PTW length of the terminal device to the terminal device in a transparent transmission manner, so that the terminal device can determine whether need to listen to the wake-up signal within the PTW length, or determine whether need to listen to a paging signal within the PTW length.

It can be learned from the foregoing example descriptions in this embodiment that, in this embodiment of this application, the terminal device receives the usage threshold of the wake-up signal from the network device. When the eDRX cycle of the terminal device is less than or equal to the usage threshold of the wake-up signal, the terminal device listens to the wake-up signal. Therefore, in this embodiment of this application, the usage threshold of the wake-up signal can be communicated. After receiving the usage threshold of the wake-up signal, the terminal device may determine, based on the usage threshold and the eDRX cycle, whether to listen to the paging message. When the eDRX cycle of the terminal device is less than or equal to the usage threshold of the wake-up signal, the terminal device listens to the wake-up signal, so that the terminal device reduces paging power consumption of the terminal device through listening to the wake-up signal, and network resource utilization is improved.

The following uses an example to describe an application scenario of the information processing methods shown in FIG. 4 to FIG. 7. The following provides descriptions by using an example in which the network device is specifically a base station, the core network device is specifically an MME, and the terminal device is specifically UE. In this embodiment of this application, the base station may coordinate a PTW length and configuration information of a wake-up signal with the core network device. The base station controls, through configuration, the terminal device that uses the wake-up signal, thereby ensuring a gain of the terminal. The application scenario of the information processing method provided in the embodiments of this application mainly includes the following processes:

S11: The base station sends the configuration information of the wake-up signal in a cell by using a system broadcast, where the configuration information may include at least one of a periodicity of the wake-up signal, and a start location and duration of the wake-up signal in one periodicity.

S12: The base station sends paging configuration information in the cell by using the system broadcast, where the paging configuration information includes a DRX cycle and the like.

S13: The base station sends DRX cycle configuration information of the cell to the core network device.

S14: If the base station configures the wake-up signal in the cell, the base station sends the configuration information of the wake-up signal to the MME, where the configuration information is used to indicate a time interval between two wake-up signals.

For example, the configuration information of the wake-up signal may include the periodicity of the wake-up signal, and a unit of the periodicity may be a time unit such as second or millisecond, or may be another unit that can reflect a time length, such as a slot, a symbol, a subframe, a system frame, or a superframe.

For another example, the configuration information of the wake-up signal may include a correspondence between the wake-up signal and the DRX cycle of the base station. For example, the wake-up signal may indicate whether the base station is to page the terminal in future x DRX cycles, and a value of x is a positive integer.

It should be noted that the base station may send the configuration information of the wake-up signal to the core network device in a plurality of procedures or messages. For example, the base station sends the configuration information of the wake-up signal to the core network device in a corresponding interface setup message (for example, an S1 interface setup request message) when an interface between the base station and the core network is set up, or the base station sends the configuration information of the wake-up signal to the core network device in a base station configuration update message in a base station configuration update process after the interface is set up.

S15: The MME configures a PTW length of the terminal device based on the configuration information of the wake-up signal from the base station, to ensure that there is more than one wake-up signal in one PTW. For example, the PTW length may be greater than or equal to a * the periodicity of the wake-up signal, and * represents multiplication. In this way, there may be at least a wake-up signals in one PTW length, and a value of a is a positive integer. For another example, the PTW length may be greater than or equal to a*x*the DRX cycle. In this way, there may be at least a wake-up signals in one PTW length.

The following describes an application scenario of a usage threshold of the wake-up signal by using an example. The application scenario mainly includes the following processes: First, the base station broadcasts the configuration information such as the periodicity of the wake-up signal, and the location and the duration in the periodicity. Then, the base station broadcasts the used usage threshold of the wake-up signal, where a unit of the usage threshold may be a time unit such as second or millisecond, or may be a subframe, a system frame, a superframe, or the like that can reflect time. In a paging process, the base station first receives the paging message of the core network device, and obtains an ID and an eDRX cycle of the terminal device from the paging message. If the eDRX cycle of the terminal device is greater than the usage threshold, of the wake-up signal, that is configured by the base station, the base station pages the terminal in a conventional paging manner, to be specific, sends, on a corresponding PO, a PDCCH scrambled by using a P-RNTI. If the eDRX cycle is not greater than the usage threshold, the base station sends, at a corresponding location, the wake-up signal of the terminal device based on the configuration information of the wake-up signal of the base station, and the ID of the terminal device. After the terminal wakes up in each eDRX cycle, if the eDRX cycle of the terminal is greater than the usage threshold, of the wake-up signal, that is broadcast by the base station, the terminal directly listens to regular paging, to be specific, decodes, on the corresponding PO based on paging configuration of the base station, the PDCCH scrambled by using the P-RNTI. If the eDRX cycle of the terminal is not greater than the usage threshold, the terminal determines a location of the wake-up signal based on the configuration information of the wake-up signal of the base station and the ID of the terminal device, and listens to the wake-up signal.

It can be learned from the foregoing example descriptions in this embodiment that the MME may configure the PTW length of the terminal device based on the configuration information of the wake-up signal of the base station, to ensure that there are a plurality of opportunities to wake up the terminal device in one PTW.

The following describes in detail early data transmission provided in an embodiment of this application. Compared with conventional transmission after connection setup, in early data transmission, data can be transmitted before connection setup. Therefore, early data transmission is a solution of earlier transmission. Early data transmission may also be data transmission in a random access process. In the conventional data transmission, a terminal device first enters a connected mode through random access, then transmits data in the connected mode, and finally releases connection. However, in this embodiment of this application, an early data transmission procedure allows a terminal to transmit uplink data in the random access process. If the data is relatively small, the terminal may not enter the connected mode, and the data transmission process and the random access process end together. In the early data transmission procedure, first, a base station configures, through broadcasting, a random access resource specifically used for early data transmission. The random access resource may include a random access time-frequency resource. After the terminal device sends a preamble, the early data transmission procedure may start. In this embodiment of this application, if the network device configures, through broadcasting, the random access resource specifically used for early data transmission, it indicates that a current network supports an early data transmission service.

A major feature of the internet of things is that there are various terminals. Different terminals have different functions, have different requirements on data transmission, and may occupy different network resources. For example, there are at least two transmission types of terminals in NB-IoT and MTC: a terminal using a control plane (CP) optimization mode and a terminal device using a user plane (UP) optimization mode.

The CP optimization mode refers to an internet of things transmission solution of transmitting data in a signaling bearer. In conventional broadband service transmission, a control signaling bearer is first set up, and then a user data transmission bearer is set up. Data is transmitted in the user data transmission bearer. However, in a small data transmission scenario of the internet of things, service data is actually small, but the control signaling bearer and the user data bearer need to be set up or released for the small amount of data, resulting in high overheads. Directly transmitting the small data in the control signaling bearer can avoid setup and release of the user data bearer, so that efficiency is higher.

Advantages of the CP optimization mode are simple and efficient. However, the data is transmitted in the control signaling bearer, and data transmission performance (delay and reliability) or the like is relatively low. Therefore, the CP optimization mode applies only to a simple scenario. For some internet of things services with relatively high requirements, the CP optimization mode is too simple and cannot be applied. Therefore, as optimization to conventional transmission by using the user data bearer, the UP optimization mode is more applicable to such internet of things small data packet transmission service that has relatively high requirements. For example, the UP optimization mode mainly includes some simplified procedures. For example, a suspension procedure is used to replace a release procedure, to reduce overheads of each access.

Figure 8:
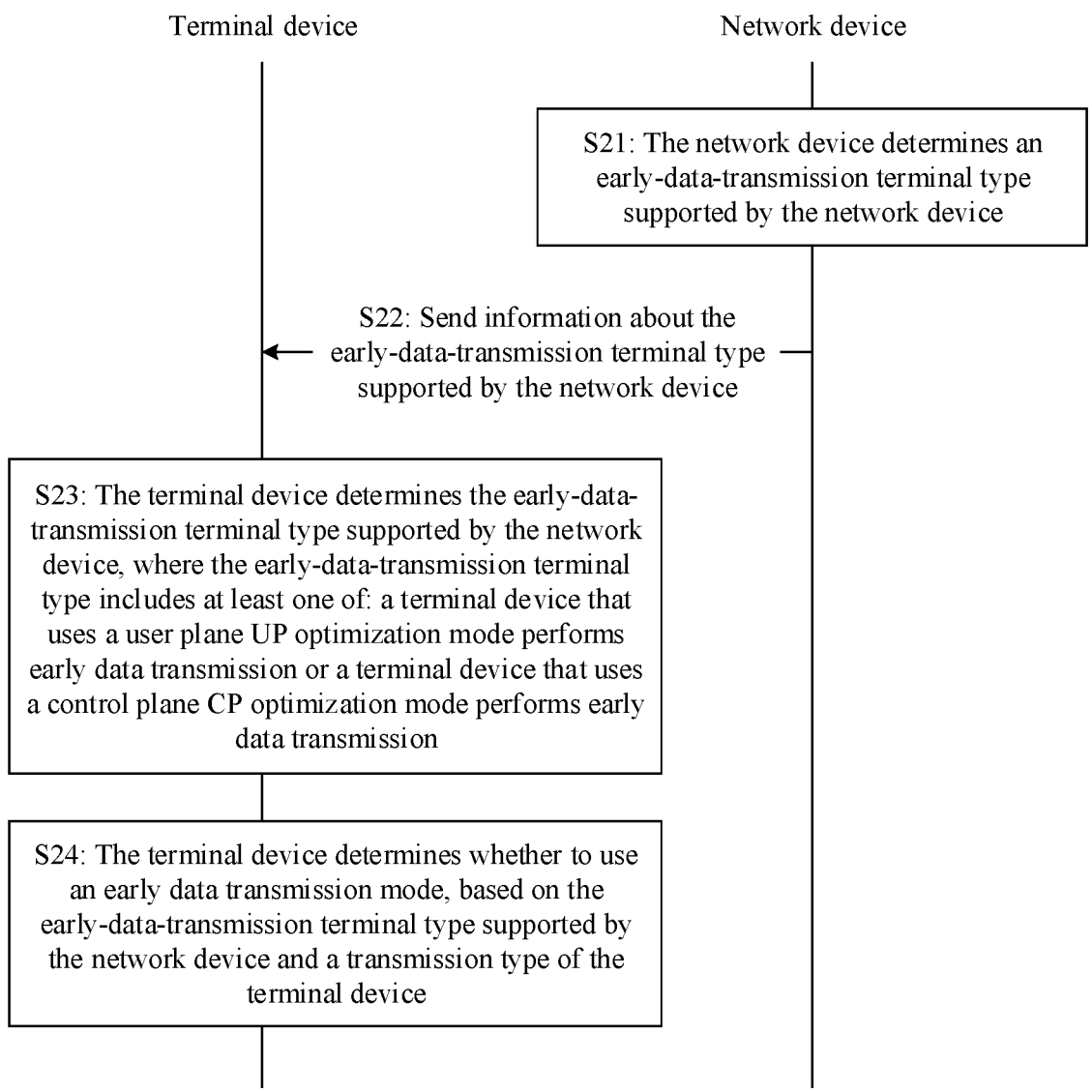
FIG. 8 is a schematic flowchart of interaction among a network device, a core network device, and a terminal device in an information processing method applicable to an embodiment of this application.

In this embodiment of this application, the network device may configure, through broadcasting, the random access resource specifically used for early data transmission, to implicitly indicate that the current network device supports the early data transmission service. Whether the early data transmission procedure is supported may be separately indicated to different types of terminal devices. In this embodiment of this application, the network device can support at least one early-data-transmission terminal type in performing early data transmission. FIG. 8 is another schematic flowchart of interaction among a network device, a terminal device, and a core network device according to an embodiment of this application. An information processing method provided in this embodiment of this application mainly includes the following processes:

S21: The network device determines an early-data-transmission terminal type supported by the network device.

The early-data-transmission terminal type includes at least one of: a terminal device that uses a user plane UP optimization mode performs early data transmission, or a terminal device that uses a control plane CP optimization mode performs early data transmission.

In some embodiments of this application, that the network device determines an early-data-transmission terminal type supported by the network device includes:

The network device determines that the network device supports a terminal device that uses the UP optimization mode in performing early data transmission.

The network device may support the terminal device that uses the UP optimization mode in performing early data transmission. For descriptions of the UP optimization mode, refer to the descriptions in the foregoing embodiments. The early-data-transmission terminal type supported by the network device may be determined by using a configuration parameter of the network device.

In some embodiments of this application, that the network device determines an early-data-transmission terminal type supported by the network device includes:

The network device determines that the network device supports a terminal device that uses the CP optimization mode in performing early data transmission.

The network device may support the terminal device that uses the CP optimization mode in performing early data transmission. For descriptions of the CP optimization mode, refer to the descriptions in the foregoing embodiments. The early-data-transmission terminal type supported by the network device may be determined by using a configuration parameter of the network device.

In some embodiments of this application, that the network device determines an early-data-transmission terminal type supported by the network device includes:

The network device determines that the network device supports both a terminal device that uses the UP optimization mode and a terminal device that uses the CP optimization mode in performing early data transmission.

The network device may support both the terminal device that uses the UP optimization mode and the terminal device that uses the CP optimization mode in performing early data transmission. For descriptions of the UP optimization mode and the CP optimization mode, refer to the descriptions in the foregoing embodiments. The early-data-transmission terminal type supported by the network device may be determined by using a configuration parameter of the network device.

S22: The network device sends, to the terminal device, information about the early-data-transmission terminal type supported by the network device.

In this embodiment of this application, after the network device determines the early-data-transmission terminal type supported by the network device, the network device sends, to the terminal device, the information about the early-data-transmission terminal type supported by the network device, so that the terminal device can receive the information about the early-data-transmission terminal type supported by the network device, and the terminal device can determine, based on the information, the early-data-transmission terminal type supported by the network device.

Further, in some embodiments of this application, when the network device determines that the network device supports a terminal device that uses the UP optimization mode in performing early data transmission, in step S22, that the network device sends, to the terminal device, information about the early-data-transmission terminal type supported by the network device includes:

The network device sends, to the terminal device, information indicating a random access resource used for early data transmission, where the information indicating the random access resource used for early data transmission is used to indicate that the network device supports a terminal device that uses the UP optimization mode in performing early data transmission; or the network device sends, to the terminal device, information indicating a random access resource used for early data transmission, and information indicating that the network device supports a terminal device that uses the UP optimization mode in performing early data transmission.

The information indicating the random access resource used for early data transmission is resource configuration information that is of the random access resource specifically used for early data transmission and that is broadcast by the network device. The information indicating the random access resource used for early data transmission may be used to indicate that the network device supports a terminal device that uses the UP optimization mode in performing early data transmission, so that the terminal device can determine, by parsing the information indicating the random access resource used for early data transmission, that the network device supports a terminal device that uses the UP optimization mode in performing early data transmission.

For another example, the information indicating that the network device supports a terminal device that uses the UP optimization mode in performing early data transmission may be specifically one piece of indication information, and the piece of indication information may be independent of the information indicating the random access resource used for early data transmission. The network device sends, to the terminal device, the information indicating that the network device supports a terminal device that uses the UP optimization mode in performing early data transmission, so that the terminal device can determine, by parsing the information indicating that the network device supports a terminal device that uses the UP optimization mode in performing early data transmission, that the network device supports a terminal device that uses the UP optimization mode in performing early data transmission.

In some embodiments of this application, that the network device sends, to the terminal device, information about the early-data-transmission terminal type supported by the network device includes:

The network device sends, to the terminal device, information indicating that the network device supports a terminal device that uses the UP optimization mode; and the network device sends, to the terminal device, information indicating a random access resource used for early data transmission, where the information indicating that the network device supports a terminal device that uses the UP optimization mode and the information indicating the random access resource used for early data transmission are used to indicate that the network device supports a terminal device that uses the UP optimization mode in performing early data transmission.

In the foregoing embodiments of this application, that the network device supports a terminal device that uses the UP optimization mode refers to support of the network device for the terminal device that uses the UP optimization mode. To be specific, the information that is sent by the network device and that indicates that the network device supports a terminal device that uses the UP optimization mode only indicates the support of the network device for the terminal device that uses the UP optimization mode. If the network device further sends the information indicating the random access resource used for early data transmission, it indicates that the network device supports a terminal device that uses the UP optimization mode in performing early data transmission. If the terminal device receives the information indicating that the network device supports a terminal device that uses the UP optimization mode, and also receives the information indicating the random access resource used for early data transmission, the terminal device may determine, based on the two pieces of received information, that the network device supports a terminal device that uses the UP optimization mode in performing early data transmission.

In some other embodiments of this application, when the network device determines that the network device supports a terminal device that uses the CP optimization mode in performing early data transmission, in step S22, that the network device sends, to the terminal device, information about the early-data-transmission terminal type supported by the network device includes:

The network device sends, to the terminal device, information indicating a random access resource used for early data transmission, where the information indicating the random access resource used for early data transmission is used to indicate that the network device supports a terminal device that uses the CP optimization mode in performing early data transmission; or the network device sends, to the terminal device, information indicating a random access resource used for early data transmission, and information indicating that the network device supports a terminal device that uses the CP optimization mode in performing early data transmission.

The information indicating the random access resource used for early data transmission is resource configuration information that is of the random access resource specifically used for early data transmission and that is broadcast by the network device. The information indicating the random access resource used for early data transmission may be used to indicate that the network device supports a terminal device that uses the CP optimization mode in performing early data transmission, so that the terminal device can determine, by parsing the information indicating the random access resource used for early data transmission, that the network device supports a terminal device that uses the CP optimization mode in performing early data transmission.

For another example, the information indicating that the network device supports a terminal device that uses the CP optimization mode in performing early data transmission may be specifically one piece of indication information, and the piece of indication information may be independent of the information indicating the random access resource used for early data transmission. The network device sends, to the terminal device, the information indicating that the network device supports a terminal device that uses the CP optimization mode in performing early data transmission, so that the terminal device can determine, by parsing the information indicating that the network device supports a terminal device that uses the CP optimization mode in performing early data transmission, that the network device supports a terminal device that uses the CP optimization mode in performing early data transmission.

In some embodiments of this application, that the network device sends, to the terminal device, information about the early-data-transmission terminal type supported by the network device includes:

The network device sends, to the terminal device, information indicating that the network device supports a terminal device that uses the CP optimization mode; and the network device sends, to the terminal device, information indicating a random access resource used for early data transmission, where the information indicating that the network device supports a terminal device that uses the CP optimization mode and the information indicating the random access resource used for early data transmission are used to indicate that the network device supports a terminal device that uses the CP optimization mode in performing early data transmission.

In the foregoing embodiments of this application, that the network device supports a terminal device that uses the CP optimization mode refers to support of the network device for the terminal device that uses the CP optimization mode. To be specific, the information that is sent by the network device and that indicates that the network device supports a terminal device that uses the CP optimization mode only indicates the support of the network device for the terminal device that uses the CP optimization mode. If the network device further sends the information indicating the random access resource used for early data transmission, it indicates that the network device supports a terminal device that uses the CP optimization mode in performing early data transmission. If the terminal device receives the information indicating that the network device supports a terminal device that uses the CP optimization mode, and also receives the information indicating the random access resource used for early data transmission, the terminal device may determine, based on the two pieces of received information, that the network device supports a terminal device that uses the CP optimization mode in performing early data transmission.

In some other embodiments of this application, when the network device determines that the network device supports both a terminal device that uses the UP optimization mode and a terminal device that uses the CP optimization mode in performing early data transmission, in step S22, that the network device sends, to the terminal device, information about the early-data-transmission terminal type supported by the network device includes:

The network device sends, to the terminal device, information indicating a random access resource used for early data transmission, where the information indicating the random access resource used for early data transmission is used to indicate that the network device supports both a terminal device that uses the UP optimization mode and a terminal device that uses the CP optimization mode in performing early data transmission; or the network device sends, to the terminal device, information indicating a random access resource used for early data transmission, and information indicating that the network device supports both a terminal device that uses the UP optimization mode and a terminal device that uses the CP optimization mode in performing early data transmission.

The information indicating the random access resource used for early data transmission is resource configuration information that is of the random access resource specifically used for early data transmission and that is broadcast by the network device. The information indicating the random access resource used for early data transmission may be used to indicate that the network device supports both a terminal device that uses the UP optimization mode and a terminal device that uses the CP optimization mode in performing early data transmission, so that the terminal device can determine, by parsing the information indicating the random access resource used for early data transmission, that the network device supports both a terminal device that uses the UP optimization mode and a terminal device that uses the CP optimization mode in performing early data transmission.

For another example, the information indicating that the network device supports both a terminal device that uses the UP optimization mode and a terminal device that uses the CP optimization mode in performing early data transmission may be specifically one piece of indication information, and the piece of indication information may be independent of the information indicating the random access resource used for early data transmission. The network device sends, to the terminal device, the information indicating that the network device supports both a terminal device that uses the UP optimization mode and a terminal device that uses the CP optimization mode in performing early data transmission, so that the terminal device can determine, by parsing the information indicating that the network device supports both a terminal device that uses the UP optimization mode and a terminal device that uses the CP optimization mode in performing early data transmission, that the network device supports both a terminal device that uses the UP optimization mode and a terminal device that uses the CP optimization mode in performing early data transmission.

In some embodiments of this application, that the network device sends, to the terminal device, information about the early-data-transmission terminal type supported by the network device includes:

The network device sends, to the terminal device, information indicating a random access resource used for early data transmission and information indicating that the network device supports a terminal device that uses the UP optimization mode in performing early data transmission, where the information indicating the random access resource used for early data transmission is used to indicate that the network device supports a terminal device that uses the CP optimization mode in performing early data transmission; or the network device sends, to the terminal device, information indicating a random access resource used for early data transmission and information indicating that the network device supports a terminal device that uses the CP optimization mode in performing early data transmission, where the information indicating the random access resource used for early data transmission is used to indicate that the network device supports a terminal device that uses the UP optimization mode in performing early data transmission.

In some embodiments of this application, that the network device sends, to the terminal device, information about the early-data-transmission terminal type supported by the network device includes:

The network device sends, to the terminal device, information about an early-data-transmission terminal type supported by the network device in a specific range, where the specific range includes at least one of a cell, a carrier, or a coverage level of the network device.

The specific range may be predefined in a protocol, or may be indicated by the network device to the terminal device. Details are not described herein. If the network device determines the early-data-transmission terminal type supported in the specific range, when the terminal device determines the early-data-transmission terminal type supported by the network device, the terminal device also needs to first determine whether a requirement on the specific range is met. For example, the terminal device determines a carrier used to initiate early data transmission, where the carrier is randomly selected from available carriers broadcast by the base station or is selected based on an ID of the terminal device. For example, an ID of the used carrier is the terminal ID mod a quantity of carriers that can be used for early data transmission, where mod represents modulo. If the base station indicates that base station supports a type of the terminal in performing early data transmission on the carrier, the early data transmission procedure is to be used. For another example, the terminal determines a coverage level for initiating early data transmission. The terminal determines the coverage level based on link quality measured by the terminal and a correspondence that is broadcast by the base station and that is between link quality and a coverage level. The correspondence is, for example, several thresholds. If the base station indicates that the base station supports a type of the terminal in performing early data transmission at the coverage level, the early data transmission procedure is to be used.

S23: The terminal device determines the early-data-transmission terminal type supported by the network device, where the early-data-transmission terminal type includes at least one of: the terminal device that uses the user plane UP optimization mode performs early data transmission, or the terminal device that uses the control plane CP optimization mode performs early data transmission.

In some embodiments of this application, that the terminal device determines the early-data-transmission terminal type supported by the network device includes:

The terminal device receives, from the network device, the information indicating the random access resource used for early data transmission; and the terminal device determines, based on the information indicating the random access resource used for early data transmission, that the network device supports a terminal device that uses the user plane UP optimization mode in performing early data transmission; or the terminal device determines, based on the information indicating the random access resource used for early data transmission, that the network device supports a terminal device that uses the control plane CP optimization mode in performing early data transmission; or the network device determines, based on the information indicating the random access resource used for early data transmission, that the network device supports both a terminal device that uses the UP optimization mode and a terminal device that uses the CP optimization mode in performing early data transmission.

In some embodiments of this application, that the terminal device determines the early-data-transmission terminal type supported by the network device includes:

The terminal device receives, from the network device, the information indicating that the network device supports a terminal device that uses the CP optimization mode; and the terminal device determines, based on the information indicating that the network device supports a terminal device that uses the CP optimization mode, that the network device supports a terminal device that uses the control plane CP optimization mode in performing early data transmission.

In some embodiments of this application, that the terminal device determines the early-data-transmission terminal type supported by the network device includes:

The terminal device receives, from the network device, the information indicating that the network device supports a terminal device that uses the UP optimization mode; and the terminal device determines, based on the information indicating that the network device supports a terminal device that uses the UP optimization mode, that the network device supports a terminal device that uses the UP optimization mode in performing early data transmission.

In some embodiments of this application, that the terminal device determines the early-data-transmission terminal type supported by the network device includes:

The terminal device receives the information indicating that the network device supports a terminal device that uses the UP optimization mode; and when the terminal device receives, from the network device, the information indicating the random access resource used for early data transmission, the terminal device determines that the network device supports a terminal device that uses the user plane UP optimization mode in performing early data transmission.

In the foregoing embodiments of this application, that the network device supports a terminal device that uses the UP optimization mode refers to support of the network device for the terminal device that uses the UP optimization mode. To be specific, the information that is sent by the network device and that indicates that the network device supports a terminal device that uses the UP optimization mode only indicates the support of the network device for the terminal device that uses the UP optimization mode. If the network device further sends the information indicating the random access resource used for early data transmission, it indicates that the network device supports a terminal device that uses the UP optimization mode in performing early data transmission. If the terminal device receives the information indicating that the network device supports a terminal device that uses the UP optimization mode, and also receives the information indicating the random access resource used for early data transmission, the terminal device may determine, based on the two pieces of received information, that the network device supports a terminal device that uses the UP optimization mode in performing early data transmission.

In some embodiments of this application, that the terminal device determines the early-data-transmission terminal type supported by the network device includes:

The terminal device receives the information indicating that the network device supports a terminal device that uses the CP optimization mode; and when the terminal device receives, from the network device, the information indicating the random access resource used for early data transmission, the terminal device determines that the network device supports a terminal device that uses the control plane CP optimization mode in performing early data transmission.

In the foregoing embodiments of this application, that the network device supports a terminal device that uses the CP optimization mode refers to support of the network device for the terminal device that uses the CP optimization mode. To be specific, the information that is sent by the network device and that indicates that the network device supports a terminal device that uses the CP optimization mode only indicates the support of the network device for the terminal device that uses the CP optimization mode. If the network device further sends the information indicating the random access resource used for early data transmission, it indicates that the network device supports a terminal device that uses the CP optimization mode in performing early data transmission. If the terminal device receives the information indicating that the network device supports a terminal device that uses the CP optimization mode, and also receives the information indicating the random access resource used for early data transmission, the terminal device may determine, based on the two pieces of received information, that the network device supports a terminal device that uses the CP optimization mode in performing early data transmission.

In some embodiments of this application, that the terminal device determines the early-data-transmission terminal type supported by the network device includes:

The terminal device receives the information indicating that the network device supports both a terminal device that uses the UP optimization mode and a terminal device that uses the CP optimization mode; and when the terminal device receives, from the network device, the information indicating the random access resource used for early data transmission, the terminal device determines that the network device supports both a terminal device that uses the UP optimization mode and a terminal device that uses the CP optimization mode.

S24: The terminal device determines whether to use an early data transmission mode, based on the early-data-transmission terminal type supported by the network device and a transmission type of the terminal device.

The transmission type of the terminal device includes: the terminal device uses the UP optimization mode, the terminal device uses the CP optimization mode, or the terminal device uses both the CP optimization mode and the UP optimization mode.

In some embodiments of this application, that the terminal device determines the early-data-transmission terminal type supported by the network device includes:

The terminal device determines the information about the early-data-transmission terminal type supported by the network device in the specific range, where the specific range includes at least one of the cell, the carrier, or the coverage level of the network device; and when determining that the requirement on the range is met, the terminal device performs the following step under triggering:

determining, by the terminal device, whether to use the early data transmission mode, based on the early-data-transmission terminal type supported by the network device and the transmission type of the terminal device.

The specific range may be predefined in the protocol, or may be indicated by the network device to the terminal device. Details are not described herein. If the network device determines the early-data-transmission terminal type supported in the specific range, when the terminal device determines the early-data-transmission terminal type supported by the network device, the terminal device also needs to first determine whether the requirement on the specific range is met. For example, the terminal device determines the carrier used to initiate early data transmission, where the carrier is randomly selected from the available carriers broadcast by the base station or is selected based on the ID of the terminal device. For example, the ID of the used carrier is the terminal ID mod the quantity of carriers that can be used for early data transmission, where mod represents modulo. If the base station indicates that base station supports the type of the terminal in performing early data transmission on the carrier, the early data transmission procedure is to be used. For another example, the terminal determines the coverage level for initiating early data transmission. The terminal determines the coverage level based on the link quality measured by the terminal and the correspondence that is broadcast by the base station and that is between link quality and a coverage level. The correspondence is, for example, several thresholds. If the base station indicates that the base station supports the type of the terminal in performing early data transmission at the coverage level, the early data transmission procedure is to be used.

The following uses an example to describe an application scenario of the information processing methods shown in FIG. 8. The following provides descriptions by using an example in which the network device is specifically a base station, the terminal device is specifically UE. In this embodiment of this application, the base station may coordinate a PTW length and configuration information of a wake-up signal with a core network device. The base station controls, through configuration, the terminal device that uses the wake-up signal, thereby ensuring a gain of the terminal. The application scenario of the information processing method provided in the embodiments of this application mainly include the following processes:

S31: The base station configures, for different carriers through broadcasting, random access resources used for early data transmission at different coverage levels (that is, one or more coverage levels), where the random access resources each include a periodicity of the random access resource, a time domain location of the resource in each periodicity, an ID of an available subcarrier, a quantity of repetition times for sending a preamble by the terminal, and the like.

S32: The base station indicates, through broadcasting, a supported terminal type for regular data transmission, where the regular data transmission herein indicates that a terminal device uses a CP optimization mode or a UP optimization mode.

S33: The base station broadcasts the random access resource specifically used for early data transmission and/or dedicated indication information, to indicate an early-data-transmission terminal type supported by the base station. This may be mainly implemented in the following manners:

1. Use configuration information of the random access resource and information indicating that the base station supports a terminal device that uses the UP optimization mode: If the base station broadcasts the random access resource specifically used for early data transmission, it indicates that the base station supports a terminal that uses the CP optimization mode in performing an early data transmission procedure, and then the base station indicates, by using dedicated indication information, whether the base station supports the terminal that uses the UP optimization mode in performing the early data transmission procedure.

2. Use configuration information of the random access resource and information indicating that the base station supports a terminal device that uses the CP optimization mode: If the base station broadcasts the random access resource specifically used for early data transmission, it indicates that the base station supports a terminal that uses the UP optimization mode in performing an early data transmission procedure, and then the base station indicates, by using dedicated indication information, whether the base station supports the terminal that uses the CP optimization mode in performing the early data transmission procedure.

3. Use only configuration information of the random access resource: If the base station broadcasts the random access resource specifically used for early data transmission, it indicates that the base station supports both a terminal that uses the CP optimization mode in performing an early data transmission procedure, and supports a terminal that uses the UP optimization mode in performing an early data transmission procedure.

4. Use configuration information of the random access resource and indication information of the regular data transmission: If the base station broadcasts the random access resource specifically used for early data transmission, it indicates that the base station supports an early-data-transmission terminal type which is the same as the terminal type, indicated in step S32, that supports the regular data transmission.

It should be noted that the foregoing indicated early-data-transmission terminal type may be indicated at a cell level, that is, an early-data-transmission terminal type supported by a current cell is indicated. The foregoing indicated early-data-transmission terminal type may alternatively be a terminal type supporting early data transmission on a carrier and/or at a coverage level. In the latter case, the base station needs to indicate the early-data-transmission terminal type for each carrier and/or each coverage level.

For example, a form of the random access resources used for early data transmission that are configured in step S31 is: A carrier 1 supports a resource at a coverage level 1, a resource at a coverage level 2, and a resource at a coverage level 3. A carrier 2 supports the resources at the coverage level 1, and the resource at the coverage level 2

If the foregoing indicated terminal type that supports early data transmission is indicated at the cell level, for example, CP is supported but UP is not supported, an effect is as follows:

Carrier 1:
Resource at the coverage level 1: CP is supported but UP is not supported.
Resource at the coverage level 2: CP is supported but UP is not supported.

Resource at the coverage level 3: CP is supported but UP is not supported.
Carrier 2:
Resource at the coverage level 1: CP is supported but UP is not supported.
Resource at the coverage level 2: CP is supported but UP is not supported.

The foregoing indicated terminal type that supports early data transmission may alternatively be indicated at a carrier level, that is, the terminal type is indicated for each carrier. Whether each carrier supports CP and UP is different, for example:
Carrier 1: CP is supported but UP is not supported.
Resource at the coverage level 1: CP is supported but UP is not supported.
Resource at the coverage level 2: CP is supported but UP is not supported.
Resource at the coverage level 3: CP is supported but UP is not supported.
Carrier 2: CP is supported but UP is not supported.
Resource at the coverage level 1: CP is supported and UP is supported.
Resource at the coverage level 2: CP is supported and UP is supported.

The foregoing indicated terminal type that supports early data transmission may alternatively be indicated for a resource at each coverage level on each carrier. Whether a random resource at each coverage level on each carrier supports CP and UP is different, for example:
Carrier 1:
Resource at the coverage level 1: CP is supported but UP is not supported.
Resource at the coverage level 2: CP is supported and UP is supported.
Resource at the coverage level 3: CP is supported and UP is supported.
Carrier 2:
Resource at the coverage level 1: CP is not supported but UP is supported.
Resource at the coverage level 2: CP is not supported but UP is supported.

S34: The terminal determines, based on a support status, of the early-data-transmission terminal type, that is indicated by the base station and a transmission type of the terminal device, whether to use early data transmission when there is a requirement for early data transmission.

For example, if the indication of the base station is the cell-level indication, and if the terminal needs to use early data transmission, and the base station indicates that a type of the terminal is supported in early data transmission, the early data transmission procedure is used.

If the indication of the base station is for each carrier and/or each coverage level, the following cases may be included:

For example, a carrier used to initiate early data transmission is determined. The terminal device randomly selects the carrier from available carriers broadcast by the base station or selects the carrier based on an ID of the terminal device. For example, an ID of the used carrier is the terminal ID mod a quantity of carriers that can be used for early data transmission. If the base station indicates that the base station supports the type of the terminal in performing early data transmission on the carrier, the early data transmission procedure is to be used.

For another example, the terminal determines a coverage level for initiating early data transmission. The terminal determines the coverage level based on link quality measured by the terminal and a correspondence that is broadcast by the base station and that is between link quality and a coverage level. The correspondence is, for example, several thresholds. If the base station indicates that the base station supports the type of the terminal in performing early data transmission at the coverage level, the early data transmission procedure is to be used.

It can be learned from the foregoing example descriptions that the base station broadcasts the support status of the early-data-transmission terminal type, and only a terminal device that meets a requirement uses a corresponding early data transmission feature.

Figure 9:
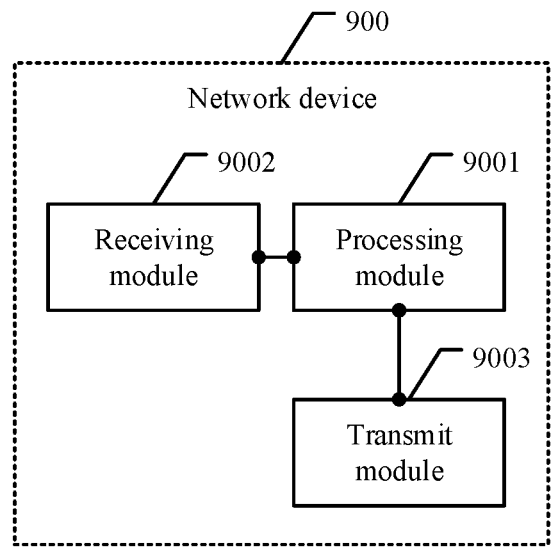
FIG. 9 is a schematic structural diagram of a network device according to an embodiment of this application.

Then, referring to FIG. 9, an embodiment of this application further provides a network device 900, including:
a processing module 901, configured to determine configuration information of a wake-up signal, where the wake-up signal is used to indicate whether to page a terminal device within a time period, and the configuration information is used to indicate a time interval between two adjacent wake-up signals; and
a transmit module 902, configured to send the configuration information of the wake-up signal to a core network device.

In some embodiments of this application, the configuration information of the wake-up signal includes at least one of the following information: information indicating a periodicity of the wake-up signal, information indicating a correspondence between the wake-up signal and a discontinuous reception DRX cycle, or information indicating the time period.

In some embodiments of this application, the configuration information of the wake-up signal further includes information indicating a start location and duration of the wake-up signal in one periodicity.

In some embodiments of this application, the transmit module 902 is further configured to send, to the core network device, information indicating the DRX cycle.

In some embodiments of this application, the transmit module 902 is specifically configured to: send an interface setup request message to the core network device, where the interface setup request message carries the configuration information of the wake-up signal; or send a configuration update message of the network device to the core network device, where the configuration update message carries the configuration information of the wake-up signal.

In some embodiments of this application, the processing module 901 is further configured to determine a usage threshold of the wake-up signal; and
the transmit module 902 is further configured to send the usage threshold of the wake-up signal to the terminal device.

In some embodiments of this application, as shown in FIG. 9, the network device 900 further includes:
a receiving module 903, configured to receive a paging message from the core network device, where the paging message includes an extended discontinuous reception eDRX cycle, where
the processing module 901 is further configured to determine that the eDRX cycle is less than or equal to the usage threshold of the wake-up signal; and
the transmit module 902 is further configured to send the wake-up signal to the terminal device when the eDRX cycle is less than or equal to the usage threshold of the wake-up signal.

In some embodiments of this application, the transmit module 902 is specifically configured to broadcast the usage threshold of the wake-up signal.

In some embodiments of this application, the receiving module 903 is configured to receive, from the core network device, the paging message for the terminal device, where the paging message includes information indicating a paging time window PTW length of the terminal device, and the PTW length is greater than the time interval between the two adjacent wake-up signals.

Figure 10:
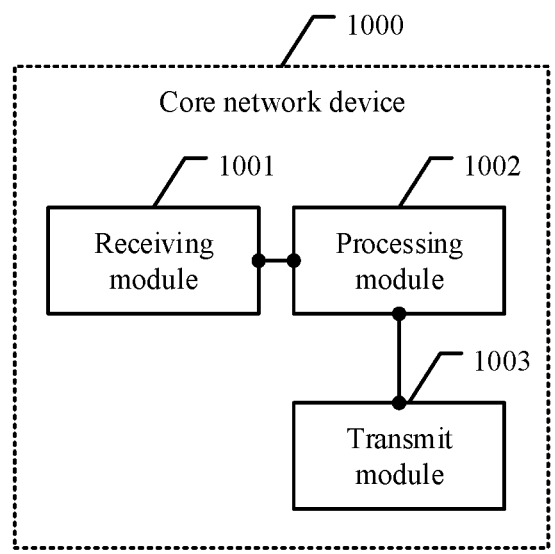
FIG. 10 is a schematic structural diagram of a core network device according to an embodiment of this application.

As shown in FIG. 10, an embodiment of this application further provides a core network device 1000, including:
  a receiving module 1001, configured to receive configuration information of a wake-up signal from a network device, where the wake-up signal is used by the network device to indicate whether to page a terminal device within a time period, and the configuration information is used to indicate a time interval between two adjacent wake-up signals.

In some embodiments of this application, the core network device 1000 further includes:
  a processing module 1002, configured to determine a paging time window PTW length of the terminal device based on the configuration information of the wake-up signal, where the PTW length is greater than the time interval between the two adjacent wake-up signals.

In some embodiments of this application, the receiving module 1001 is specifically configured to: receive an interface setup request message from the network device, where the interface setup request message carries the configuration information of the wake-up signal; or receive a configuration update message of the network device from the network device, where the configuration update message carries the configuration information of the wake-up signal.

In some embodiments of this application, the configuration information of the wake-up signal includes information indicating a periodicity of the wake-up signal, and the processing module 1002 is specifically configured to determine the PTW length based on the periodicity of the wake-up signal, where the PTW length is greater than a value of the periodicity of the wake-up signal.

In some embodiments of this application, the configuration information of the wake-up signal includes information indicating a correspondence between the wake-up signal and a discontinuous reception DRX cycle, and the processing module 1002 is specifically configured to: determine that the correspondence between the wake-up signal and the discontinuous reception DRX cycle is that one wake-up signal corresponds to x DRX cycles, where x is a positive integer; and determine the PTW length based on the correspondence between the wake-up signal and the discontinuous reception DRX cycle, where the PTW length is greater than a result obtained by multiplying x by a value of the DRX cycle.

In some embodiments of this application, the configuration information of the wake-up signal includes information indicating the time period, and the processing module 1002 is specifically configured to determine the PTW length based on information about the time period, where the PTW length is greater than a value of the time period.

In some embodiments of this application, the core network device 1000 further includes:
  a transmit module 1003, configured to send a paging message to the network device, where the paging message includes an extended discontinuous reception eDRX cycle.

In some embodiments of this application, the transmit module 1003 is configured to send, to the terminal device, information indicating the PTW length; and/or the transmit module 1003 is configured to send, to the network device, a paging message for the terminal device, where the paging message includes the information indicating the PTW length.

Figure 11:
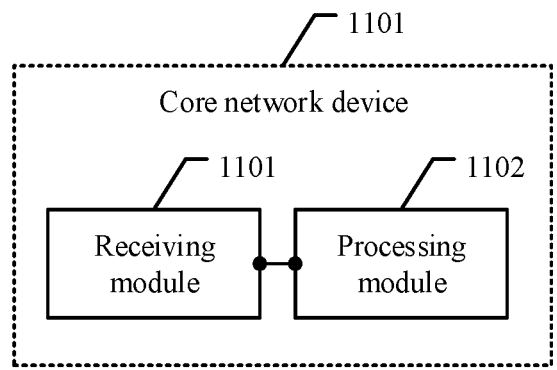
FIG. 11 is a schematic structural diagram of a terminal device according to an embodiment of this application.

As shown in FIG. 11, an embodiment of this application provides a terminal device 1100, including:
  a receiving module 1101, configured to receive a usage threshold of a wake-up signal from a network device; and
  a processing module 1102, configured to listen to the wake-up signal when an extended discontinuous reception eDRX cycle of the terminal device is less than or equal to the usage threshold of the wake-up signal.

In some embodiments of this application, the processing module 1102 is further configured to listen to, by the terminal device, a paging message from the network device when the eDRX cycle of the terminal device is greater than the usage threshold of the wake-up signal.

In some embodiments of this application, the processing module 1102 is further configured to: when detecting the wake-up signal through listening, listen to the paging message from the network device within a time period indicated by the wake-up signal.

In some embodiments of this application, the receiving module 1101 is further configured to receive, from a core network device, information indicating a paging time window PTW length, where the paging time window PTW length is greater than a time interval between two adjacent wake-up signals.

An embodiment of this application provides a network device, including:
  a processing module, configured to determine an early-data-transmission terminal type supported by the network device, where the early-data-transmission terminal type includes at least one of: a terminal device that uses a user plane UP optimization mode performs early data transmission, or a terminal device that uses a control plane CP optimization mode performs early data transmission; and
  a transmit module, configured to send, to the terminal device, information about the early-data-transmission terminal type supported by the network device.

In some embodiments of this application, the processing module is specifically configured to determine that the network device supports a terminal device that uses the UP optimization mode in performing early data transmission.

In some embodiments of this application, the transmit module is specifically configured to send, to the terminal device, information indicating a random access resource used for early data transmission, where the information indicating the random access resource used for early data transmission is used to indicate that the network device supports a terminal device that uses the UP optimization mode in performing early data transmission; or send, to the terminal device, information indicating a random access resource used for early data transmission and information indicating that the network device supports a terminal device that uses the UP optimization mode in performing early data transmission.

In some embodiments of this application, the transmit module is specifically configured to send, to the terminal device, information indicating that the network device supports a terminal device that uses the UP optimization mode; and send, to the terminal device, information indicating a random access resource used for early data transmission, where
  the information indicating that the network device supports a terminal device that uses the UP optimization mode and the information indicating the random access resource used for early data transmission are used to indicate that the network device supports a terminal device that uses the UP optimization mode in performing early data transmission.

In some embodiments of this application, the processing module is specifically configured to determine that the network device supports a terminal device that uses the CP optimization mode in performing early data transmission.

In some embodiments of this application, the transmit module is specifically configured to send, to the terminal device, information indicating a random access resource used for early data transmission, where the information indicating the random access resource used for early data transmission is used to indicate that the network device supports a terminal device that uses the CP optimization mode in performing early data transmission; or send, to the terminal device, information indicating a random access resource used for early data transmission and information indicating that the network device supports a terminal device that uses the CP optimization mode in performing early data transmission.

In some embodiments of this application, the transmit module is specifically configured to: send, to the terminal device, information indicating that the network device supports a terminal device that uses the CP optimization mode; and send, to the terminal device, information indicating a random access resource used for early data transmission, where the information indicating that the network device supports a terminal device that uses the CP optimization mode and the information indicating the random access resource used for early data transmission are used to indicate that the network device supports a terminal device that uses the CP optimization mode in performing early data transmission.

In some embodiments of this application, the processing module is specifically configured to determine that the network device supports both a terminal device that uses the UP optimization mode and a terminal device that uses the CP optimization mode in performing early data transmission.

In some embodiments of this application, the transmit module is specifically configured to send, to the terminal device, information indicating a random access resource used for early data transmission, where the information indicating the random access resource used for early data transmission is used to indicate that the network device supports both a terminal device that uses the UP optimization mode and a terminal device that uses the CP optimization mode in performing early data transmission; or send, to the terminal device, information indicating a random access resource used for early data transmission and information indicating that the network device supports both a terminal device that uses the UP optimization mode and a terminal device that uses the CP optimization mode in performing early data transmission.

In some embodiments of this application, the transmit module is specifically configured to send, to the terminal device, information indicating that the network device supports a terminal device that uses the CP optimization mode in performing early data transmission, and information indicating that the network device supports a terminal device that uses the UP optimization mode in performing early data transmission.

In some embodiments of this application, the transmit module is specifically configured to: send, to the terminal device, information indicating a random access resource used for early data transmission, and information indicating that the network device supports a terminal device that uses the UP optimization mode in performing early data transmission, where the information indicating the random access resource used for early data transmission is used to indicate that the network device supports a terminal device that uses the CP optimization mode in performing early data transmission; or send, to the terminal device, information indicating a random access resource used for early data transmission, and information indicating that the network device supports a terminal device that uses the CP optimization mode in performing early data transmission, where the information indicating the random access resource used for early data transmission is used to indicate that the network device supports a terminal device that uses the UP optimization mode in performing early data transmission.

In some embodiments of this application, the transmit module is specifically configured to send, to the terminal device, information about an early-data-transmission terminal type supported by the network device in a specific range, where the specific range includes at least one of a cell, a carrier, or a coverage level of the network device.

An embodiment of this application further provides a terminal device, including:
- a processing module, configured to determine an early-data-transmission terminal type supported by a network device, where the early-data-transmission terminal type includes at least one of: a terminal device that uses the user plane UP optimization mode performs early data transmission, or a terminal device that uses the control plane CP optimization mode performs early data transmission, where
- the processing module is configured to determine whether to use an early data transmission mode, based on the early-data-transmission terminal type supported by the network device and a transmission type of the terminal device, where the transmission type of the terminal device includes: the terminal device uses the UP optimization mode, the terminal device uses the CP optimization mode, or the terminal device uses both the CP optimization mode and the UP optimization mode.

In some embodiments of this application, the terminal device further includes a receiving module, configured to receive, from the network device, information indicating a random access resource used for early data transmission, where
- the processing module is specifically configured to: determine, based on the information indicating the random access resource used for early data transmission, that the network device supports a terminal device that uses the user plane UP optimization mode in performing early data transmission; or determine, based on the information indicating the random access resource used for early data transmission, that the network device supports a terminal device that uses the control plane CP optimization mode in performing early data transmission; or determine, based on the information indicating the random access resource used for early data transmission, that the network device supports both a terminal device that uses the UP optimization mode and a terminal device that uses the CP optimization mode in performing early data transmission.

In some embodiments of this application, the terminal device further includes a receiving module, configured to receive, from the network device, information indicating that the network device supports a terminal device that uses the CP optimization mode, where the processing module is specifically configured to determine, based on the information indicating that the network device supports a terminal device that uses the CP optimization mode, that the network device supports a terminal device that uses the control plane CP optimization mode in performing early data transmission.

In some embodiments of this application, the terminal device further includes a receiving module, configured to receive, from the network device, information indicating that the network device supports a terminal device that uses the UP optimization mode, where
the processing module is specifically configured to determine, based on the information indicating that the network device supports a terminal device that uses the UP optimization mode, that the network device supports a terminal device that uses the UP optimization mode in performing early data transmission.

In some embodiments of this application, the receiving module is specifically configured to receive information indicating that the network device supports a terminal device that uses the UP optimization mode, where
the processing module is specifically configured to: when the terminal device receives, from the network device, information indicating a random access resource used for early data transmission, determine that the network device supports a terminal device that uses the user plane UP optimization mode in performing early data transmission.

In some embodiments of this application, the terminal device further includes a receiving module, configured to receive information indicating that the network device supports a terminal device that uses the CP optimization mode, where
the processing module is specifically configured to: when the terminal device receives, from the network device, information indicating a random access resource used for early data transmission, determine that the network device supports a terminal device that uses the control plane CP optimization mode in performing early data transmission.

In some embodiments of this application, the terminal device further includes a receiving module, configured to receive information indicating that the network device supports both a terminal device that uses the UP optimization mode and a terminal device that uses the CP optimization mode, where
the processing module is specifically configured to: when the terminal device receives, from the network device, information indicating a random access resource used for early data transmission, determine that the network device supports both a terminal device that uses the UP optimization mode and a terminal device that uses the CP optimization mode.

In some embodiments of this application, the processing module is further configured to determine information about an early-data-transmission terminal type supported by the network device in a specific range, where the specific range includes at least one of a cell, a carrier, or a coverage level of the network device; and
the processing module is further configured to: when determining that a requirement on the range is met, perform the following step under triggering: determining whether to use the early data transmission mode, based on the early-data-transmission terminal type supported by the network device and the transmission type of the terminal device.

In the foregoing embodiments, the processing module may be implemented by a processor, the receiving module may be implemented by a receiver, a receiver circuit, or an input interface, and the transmit module may be implemented by a transmitter, a transmitter circuit, or an output interface.

Figure 12:
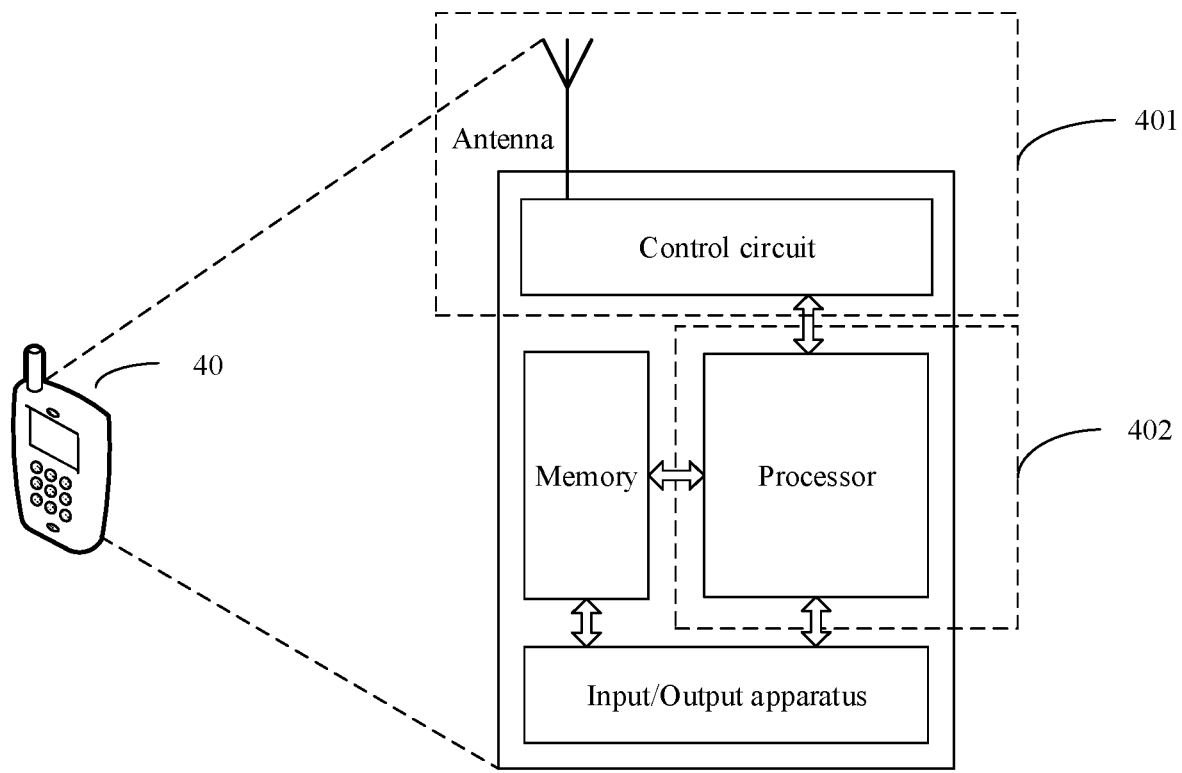
FIG. 12 is a schematic structural diagram of a network device according to an embodiment of this application.

FIG. 12 is a schematic structural diagram of a terminal device according to an embodiment of this application. The terminal device may be applicable to the system shown in FIG. 1, and perform a function of the terminal device in the foregoing method embodiments. For ease of description, FIG. 12 shows only main components of the terminal device. As shown in FIG. 12, the terminal device 40 includes a processor, a memory, a control circuit, an antenna, and an input/output apparatus. The processor is mainly configured to: process a communication protocol and communication data, control the entire terminal device, execute a software program, and process data of the software program. For example, the processor is configured to support the terminal device in performing actions described in the foregoing method embodiments, for example, receiving a usage threshold of a wake-up signal, and determining, based on the usage threshold and an eDRX cycle, whether to listen to the wake-up signal. The memory is mainly configured to store the software program and the data, for example, store the usage threshold of the wake-up signal, and the like described in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to receive and send a radio frequency signal in an electromagnetic wave form. The input/output apparatus, such as a touchscreen, a display screen, or a keyboard, is mainly configured to receive data entered by a user and output data to the user.

After the terminal device is powered on, the processor may read the software program in a storage unit (e.g. the memory), explain and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal through the antenna in the electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data and processes the data.

A person skilled in the art may understand that for ease of description, FIG. 12 shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 12. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program, so that the processor executes the software program to implement a baseband processing function.

In this embodiment of this application, the control circuit and the antenna that has a transceiver function may be considered as a transceiver unit 401 of the terminal device 40. For example, the transceiver unit 401 is configured to support the terminal device in performing the foregoing receiving function and sending function. The processor having a processing function is considered as a processing unit 402 of the terminal device 40. As shown in FIG. 12, the terminal device 40 includes the transceiver unit 401 and the processing unit 402. The transceiver unit may also be referred to as a transceiver, a transceiver machine, a transceiver apparatus, or the like. Optionally, a device configured to implement a receiving function in the transceiver unit 401 may be considered as a receiving unit, and a device configured to implement a sending function in the transceiver unit 401 may be considered as a sending unit. In other words, the transceiver unit 401 includes the receiving unit and the sending unit. The receiving unit may also be referred to as a receiving machine, an input port, a receiving circuit, or the like. The sending unit may be referred to as a transmitting machine, a transmitter, a transmitter circuit, or the like.

The processor 402 may be configured to execute an instruction stored in the memory, to control the transceiver unit 401 to receive a signal and/or send a signal, to complete a function of the terminal device in the foregoing method embodiments. In an implementation, a function of the transceiver unit 401 may be implemented by using a transceiver circuit or a dedicated transceiver chip.

Figure 13:
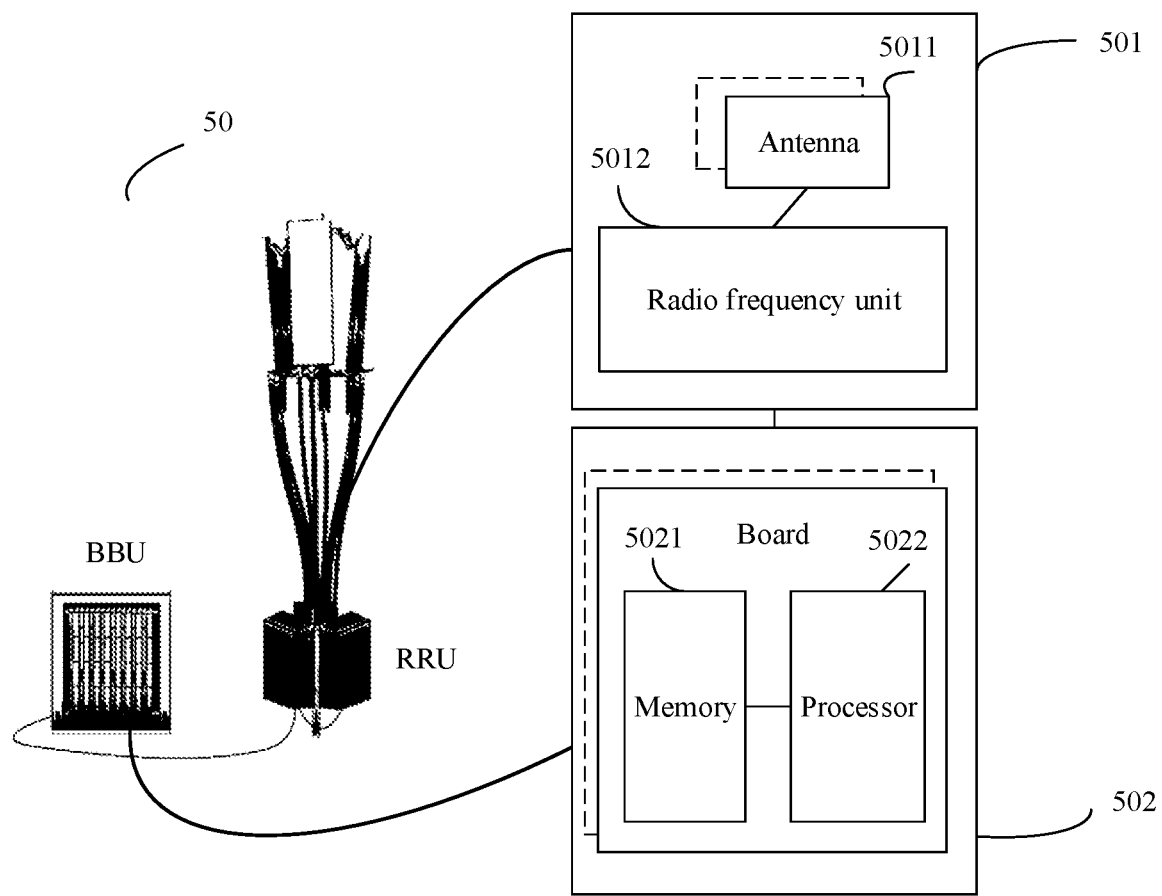
FIG. 13 is a schematic structural diagram of a terminal device according to an embodiment of this application.

FIG. 13 is a schematic structural diagram of a network device according to an embodiment of this application, for example, may be a schematic structural diagram of a base station. As shown in FIG. 13, the base station may be applied to the system shown in FIG. 1, to perform a function of the network device in the foregoing method embodiments. The base station 50 may include one or more radio frequency units, such as a remote radio unit (remote radio unit, RRU) 501 and one or more baseband units (baseband unit, BBU) (which may also be referred to as digital units, digital unit, DU) 502. The RRU 501 may be referred to as a transceiver unit, a transceiver machine, a transceiver circuit, a transceiver, or the like, and may include at least one antenna 5011 and a radio frequency unit 5012. The RRU 501 is mainly configured to send and receive a radio frequency signal and perform conversion between a radio frequency signal and a baseband signal. For example, the RRU 501 is configured to send, to a core network device, configuration information of a wake-up signal in the foregoing embodiments, or send, to a terminal device, a usage threshold of the wake-up signal in the foregoing embodiments. The BBU 502 is mainly configured to: perform baseband processing, control the base station, and so on. The RRU 501 and the BBU 502 may be physically disposed together, or may be physically separated, that is, in a distributed base station.

The BBU 502 is a control center of the base station, may also be referred to as a processing unit, and is mainly configured to complete baseband processing functions such as channel coding, multiplexing, modulation, and spectrum spreading. For example, the BBU (the processing unit) 502 may be configured to control the base station to perform an operation procedure related to the network device in the foregoing method embodiments.

In an example, the BBU 502 may include one or more boards, and a plurality of boards may jointly support a radio access network (such as an LTE network) of a single access standard, or may separately support radio access networks (such as an LTE network, a 5G network, and another network) of different access standards. The BBU 502 further includes a memory 5021 and a processor 5022. The memory 5021 is configured to store a necessary instruction and necessary data. For example, the memory 5021 stores the configuration information of the wake-up signal, the usage threshold of the wake-up signal, an eDRX cycle, a DRX cycle, and the like in the foregoing embodiments. The processor 5022 is configured to control the base station to perform a necessary action, for example, control the base station to perform the operation procedure related to the network device in the foregoing method embodiments. The memory 5021 and the processor 5022 may serve one or more boards. In other words, a memory and a processor may be disposed on each board. Alternatively, a plurality of boards may share the same memory and the same processor. In addition, a necessary circuit may be further disposed on each board.

Figure 14:
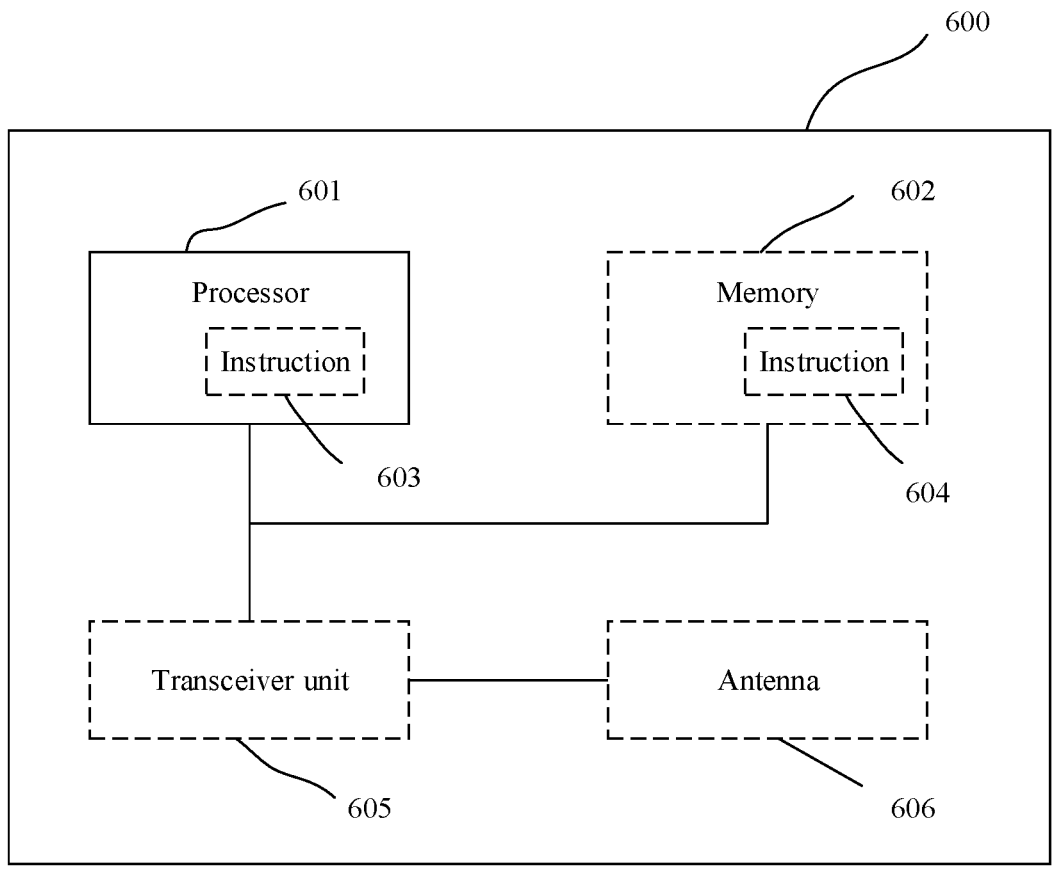
FIG. 14 is a schematic structural diagram of a communications apparatus according to an embodiment of this application.

FIG. 14 is a schematic structural diagram of a communications apparatus 600. The apparatus 600 may be configured to implement the methods described in the foregoing method embodiments. Refer to the descriptions in the foregoing method embodiments. The communications apparatus 600 may be a chip, a network device (such as a base station), a terminal device, a core network device, another network device, or the like.

The communications apparatus 600 includes one or more processors 601. The processor 601 may be a general purpose processor, a dedicated processor, or the like. For example, the processor 601 may be a baseband processor or a central processing unit. The baseband processor may be configured to process a communication protocol and communication data, and the central processing unit may be configured to: control the communications apparatus (such as a base station, a terminal, or a chip), execute a software program, and process data of the software program. The communications apparatus may include a transceiver unit, configured to input (receive) and output (send) a signal. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 600 includes one or more processors 601, and the one or more processors 601 may implement the method performed by the network device or the terminal device in the foregoing embodiments.

In a possible design, the communications apparatus 600 is configured to obtain configuration information of a wake-up signal and send the configuration information of the wake-up signal. The function of obtaining the configuration information of the wake-up signal and sending the configuration information of the wake-up signal may be implemented by using one or more processors. For example, the configuration information of the wake-up signal may be obtained by using one or more processors, and the configuration information of the wake-up signal may be sent by using a transceiver, an input/output circuit, or an interface of a chip. For the configuration information of the wake-up signal, refer to related descriptions in the foregoing method embodiments.

In a possible design, the communications apparatus 600 is configured to receive configuration information of a wake-up signal and determine a PTW length of a terminal device based on the configuration information of the wake-up signal. For the configuration information of the wake-up signal and for how to determine the PTW length, refer to related descriptions in the foregoing method embodiments. For example, the configuration information of the wake-up signal may be received by using a transceiver, an input/output circuit, or an interface of a chip, and the PTW length may be determined by one or more processors based on the configuration information of the wake-up signal.

In a possible design, the communications apparatus 600 may be configured to obtain a usage threshold of a wake-up signal and send the usage threshold of the wake-up signal. The function of obtaining the usage threshold of the wake-up signal and sending the usage threshold of the wake-up signal may be implemented by using one or more processors. For example, the usage threshold of the wake-up signal may be obtained by using one or more processors, and the usage threshold of the wake-up signal may be sent by using a transceiver, an input/output circuit, or an interface of a chip. For the usage threshold of the wake-up signal, refer to related descriptions in the foregoing method embodiments.

In a possible design, the communications apparatus 600 may be configured to receive a usage threshold of a wake-up signal and determine, based on the usage threshold of the wake-up signal, whether to listen to the wake-up signal. For the usage threshold of the wake-up signal and for how to determine the PTW length, refer to related descriptions in the foregoing method embodiments. For example, the usage threshold of the wake-up signal may be received by using a transceiver, an input/output circuit, or an interface of a chip, and whether to listen to the wake-up signal may be determined by using one or more processors based on the usage threshold of the wake-up signal.

Optionally, the processor 601 may further implement another function in addition to the method in the forgoing embodiments.

Optionally, in a design, the processor 601 may execute instructions, so that the communications apparatus 600 performs the methods described in the foregoing method embodiments. All or a part of the instructions, for example, an instruction 603, may be stored in the processor, or all or a part of the instructions, for example, an instruction 604, may be stored in the memory 602 coupled to the processor. Alternatively, the communications apparatus 600 may be enabled, by using both the instructions 603 and 604, to perform the methods described in the foregoing method embodiments.

In another possible design, the communications apparatus 600 may alternatively include a circuit. The circuit may implement a function of the network device or the terminal device in the foregoing method embodiments.

In another possible design, the communications apparatus 600 may include one or more memories 602 that store the instruction 604. The instruction may be run on the processor, to enable the communications apparatus 600 to perform the methods described in the foregoing method embodiments. Optionally, the memory may further store data. Optionally, the processor may also store an instruction and/or data. For example, the one or more memories 602 may store the configuration information of the wake-up signal described in the foregoing embodiments, the usage threshold of the wake-up signal in the foregoing embodiments, or the like. The processor and the memory may be disposed separately, or may be integrated together.

In another possible design, the communications apparatus 600 may further include a transceiver unit 605 and an antenna 606. The processor 601 may be referred to as a processing unit, and controls the communications apparatus (a terminal or a base station). The transceiver unit 605 may be referred to as a transceiver machine, a transceiver circuit, a transceiver, or the like, and is configured to implement a transceiver function of the communications apparatus by using the antenna 606.

This application further provides a communications system, including the foregoing one or more network devices and one or more terminal devices.

It should be noted that, the processor in the embodiments of this application may be an integrated circuit chip, and has a signal processing capability. In an implementation process, the steps in the foregoing method embodiments may be implemented by using a hardware integrated logical circuit in the processor, or by using instructions in a form of software. The processor may be a general purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logical device, a discrete gate or a transistor logic device, or a discrete hardware component. It may implement or perform the methods, the steps, and the logical block diagrams that are disclosed in the embodiments of this application. The general purpose processor may be a microprocessor, or the processor may be any conventional processor or the like. The steps of the methods disclosed with reference to the embodiments of this application may be directly executed and accomplished by using a hardware decoding processor, or may be executed and accomplished by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these and any memory of another proper type.

An embodiment of this application further provides a computer-readable medium. The computer-readable medium stores a computer program. When the computer program is executed by a computer, the communication method in any foregoing method embodiment is implemented.

An embodiment of this application further provides a computer program product. When the computer program product is executed by a computer, the communication method in any foregoing method embodiment is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

An embodiment of this application further provides a processing apparatus, including a processor and an interface. The processor is configured to perform the communication method in any foregoing method embodiment.

It should be understood that the processing apparatus may be a chip. The processor may be implemented by hardware, or may be implemented by software. When implemented by hardware, the processor may be a logic circuit, an integrated circuit, or the like. When implemented by the software, the processor may be a general-purpose processor. The general-purpose processor is implemented by reading software code stored in a memory. The memory may be integrated into the processor, may be located outside the processor, or may exist independently.

It should be understood that "one embodiment" or "an embodiment" mentioned in the whole specification does not mean that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining A based on B does not mean that B is determined based on A only; that is, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

With descriptions of the foregoing implementations, a person skilled in the art may clearly understand that this application may be implemented by hardware, firmware or a combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk and disc used in this application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed:

1. An information processing method, performed by a network device or a chip for the network device, comprising:
    sending information about an early-data-transmission terminal type allowed by the network device, wherein the early-data-transmission terminal type comprises at least one of the following information (a) and (b):
    (a) a terminal device uses a user plane (UP) optimization mode in performing early data transmission, or
    (b) a terminal device uses a control plane (CP) optimization mode in performing the early data transmission; and
    wherein the early data transmission is a data transmission during a random access procedure;
    broadcasting at least one threshold of link quality for a determination of at least two coverage levels; and
    performing the early data transmission with the terminal device,
    wherein the early data transmission is based on information about the early-data-transmission terminal type and a coverage level based on the at least one threshold of link quality.

2. The method according to claim 1, wherein
    the sending the information about the early-data-transmission terminal type allowed by the network device comprises:
    sending, to the terminal device, information indicating that the network device allows a terminal device uses the UP optimization mode in performing the early data transmission;
    and wherein the method further comprises:
    sending, to the terminal device, information indicating a random access resource used for the early data transmission.

3. The method according to claim 1, wherein the sending the information about the early-data-transmission terminal type allowed by the network device comprises:
    sending, the terminal device, information indicating that the network device supports a terminal device uses the CP optimization mode in performing the early data transmission; and
    wherein the method further comprises:
    sending, to the terminal device, information indicating a random access resource used for the early data transmission.

4. The method according to claim 1,
    wherein the sending the information about the early-data-transmission terminal type allowed by the network device comprises:
    sending, to the terminal device, information indicating that the network device supports a terminal device uses the CP optimization mode in performing the early data transmission, and information indicating that the network device supports a terminal device uses the UP optimization mode in performing the early data transmission; and
    wherein the method further comprises:
    sending, to the terminal device, information indicating a random access resource used for the early data transmission.

5. The method according to claim 1, further comprising:
    sending information about a cell or a carrier;
    wherein the early data transmission is based on the information about the cell or the carrier.

6. An information processing method, performed by a terminal device, or, a chip for the terminal device, comprising:
    receiving information about an early-data-transmission terminal type allowed by a network device from the network device, wherein the early-data-transmission terminal type comprises at least one of the following information (a) and (b):
(a) a terminal device uses a user plane (UP) optimization mode in performing early data transmission, or
(b) a terminal device uses a control plane (CP) optimization mode in performing the early data transmission;
wherein the early data transmission is a data transmission during a random access procedure;
receiving at least one threshold of link quality for a determination of at least two coverage levels from the network device; and
performing the early data transmission with the network device based on the information about the early-data-transmission terminal type and a coverage level based on the at least one threshold of link quality.

7. The method according to claim 6, further comprising:
determining whether to use an early data transmission mode, based on the early-data-transmission terminal type allowed by the network device and a transmission type of the terminal device, wherein the transmission type of the terminal device comprises:
the terminal device uses the UP optimization mode, the terminal device uses the CP optimization mode, or, the terminal device uses both the CP optimization mode and the UP optimization mode.

8. The method according to claim 6, wherein the receiving the information about the early-data-transmission terminal type allowed by the network device comprises:
receiving information indicating a random access resource used for the early data transmission and information indicating that the network device allows a terminal device uses the UP optimization mode in performing the early data transmission.

9. The method according to claim 6, wherein the receiving the information about the early-data-transmission terminal type allowed by the network device comprises:
receiving information indicating a random access resource used for the early data transmission and information indicating that the network device allows a terminal device uses the CP optimization mode in performing the early data transmission.

10. The method according to claim 6, wherein the receiving the information about the early-data-transmission terminal type allowed by the network device comprises:
receiving information indicating a random access resource used for the early data transmission, information indicating that the network device allows a terminal device uses the UP optimization mode in performing the early data transmission and information indicating that the network device allows a terminal device uses the CP optimization mode in performing the early data transmission.

11. The method according to claim 6, wherein the coverage level is determined based on the at least one threshold of link quality and a link quality measured by the terminal device.

12. An apparatus comprising:
a processing circuit, configured to execute instructions stored in a memory to cause the apparatus to perform the following:
sending information about an early-data-transmission terminal type allowed by a network device which the apparatus is or used for, wherein the early-data-transmission terminal type comprises at least one of the following information (a) and (b):
(a) a terminal device uses a user plane (UP) optimization mode in performing early data transmission, or
(b) a terminal device uses a control plane (CP) optimization mode in performing the early data transmission;
wherein the early data transmission is a data transmission during a random access procedure;
broadcasting at least one threshold of link quality for a determination of at least two coverage levels; and
performing the early data transmission with the terminal device,
wherein the early data transmission is based on information about the early-data-transmission terminal type and a coverage level based on the at least one threshold of link quality.

13. The apparatus according to claim 12, wherein the processing circuit is further configured to execute instructions stored in a memory to cause the apparatus to send information indicating a random access resource used for the early data transmission; and the information about an early-data-transmission terminal type indicating that the network device allows a terminal device uses the UP optimization mode in performing the early data transmission.

14. The apparatus according to claim 12, wherein the processing circuit is further configured to execute instructions stored in a memory to cause the apparatus to send information indicating a random access resource used for the early data transmission; and the information about an early-data-transmission terminal type indicating that the network device allows a terminal device uses the CP optimization mode in performing early data transmission.

15. The apparatus according to claim 12, wherein the processing circuit is further configured to execute instructions stored in a memory to cause the apparatus to send information indicating a random access resource used for the early data transmission; and the information about an early-data-transmission terminal type indicating that the network device allows a terminal device that uses the UP optimization mode in performing the early data transmission and the network device allows a terminal device uses the CP optimization mode in performing the early data transmission.

16. The apparatus according to claim 12, wherein the processing circuit is further configured to execute instructions stored in a memory to cause the apparatus to send information about a cell or a carrier;
wherein the early data transmission is based on the information about the cell or the carrier.

17. An apparatus comprising:
a processing circuit, configured to execute instructions stored in a memory to cause the apparatus to perform the following:
receiving information about an early-data-transmission terminal type allowed by a network device,
wherein the early-data-transmission terminal type comprises at least one of the following information (a) and (b):
(a) a terminal device uses a user plane (UP) optimization mode in performing early data transmission, or
(b) a terminal device uses a control plane (CP) optimization mode in performing the early data transmission;
wherein the early data transmission is a data transmission during a random access procedure;
receiving at least one threshold of link quality for a determination of at least two coverage levels from the network device; and
performing the early data transmission with the network device based on the information about the early-datatransmission terminal type and a coverage level based on the at least one threshold of link quality.

18. The apparatus according to claim 17, wherein the processing circuit is further configured to execute instructions stored in a memory to cause the apparatus to determine whether to use an early data transmission mode, based on the early-data-transmission terminal type allowed by the network device and a transmission type of a terminal device which the apparatus is or is used for, wherein the transmission type of the terminal device comprises: the terminal device uses the UP optimization mode, the terminal device uses the CP optimization mode, or, the terminal device uses both the CP optimization mode and the UP optimization mode.

19. The apparatus according to claim 17, wherein the processing circuit is further configured to execute instructions stored in a memory to cause the apparatus to receive information indicating a random access resource used for the early data transmission.

20. The apparatus according to claim 17, wherein the coverage level is determined based on the at least one threshold of link quality and a link quality measured by the apparatus.

* * * * *